US010846956B2

(12) United States Patent
Cate et al.

(10) Patent No.: US 10,846,956 B2
(45) Date of Patent: *Nov. 24, 2020

(54) MOVABLE BARRIER IMMINENT MOTION NOTIFICATION SYSTEM AND METHOD

(71) Applicant: The Chamberlain Group, Inc., Oak Brook, IL (US)

(72) Inventors: Casparus Cate, Chicago, IL (US); Jordan Ari Farber, Chicago, IL (US); James J. Fitzgibbon, Batavia, IL (US); Nathan J. Kopp, Fremont, CA (US)

(73) Assignee: The Chamberlain Group, Inc., Oak Brook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/596,330

(22) Filed: Oct. 8, 2019

(65) Prior Publication Data

US 2020/0242862 A1    Jul. 30, 2020

Related U.S. Application Data

(63) Continuation-in-part of application No. 16/257,045, filed on Jan. 24, 2019.

(51) Int. Cl.
*G07C 9/00* (2020.01)
*H04W 4/021* (2018.01)

(52) U.S. Cl.
CPC ..... *G07C 9/00182* (2013.01); *G07C 9/00896* (2013.01); *H04W 4/021* (2013.01);
(Continued)

(58) Field of Classification Search
None
See application file for complete search history.

(56) References Cited

U.S. PATENT DOCUMENTS 4,360,807 A    11/1982   Zettergren
4,464,651 A     8/1984   Duhame
(Continued)

FOREIGN PATENT DOCUMENTS

CN        106951253      7/2017
WO     2019157149      8/2019

OTHER PUBLICATIONS

Canadian Patent Application No. 2,693,580; Office Action dated Mar. 24, 2015; 4 pages.
(Continued)

*Primary Examiner* — K. Wong
(74) *Attorney, Agent, or Firm* — Fitch, Even, Tabin & Flannery LLP

(57) ABSTRACT

A movable barrier operator system is provided that includes a moving-barrier imminent motion notification apparatus, a motor, a controller, and communication circuitry configured to communicate with a remote control. In response to the communication circuitry receiving a communication from the remote control, the controller causes the motor to change the state of the movable barrier and additionally operate the moving-barrier imminent motion notification apparatus upon a determination of the remote control being beyond a physical proximity of a location associated with the movable barrier operator system. Upon a determination that the remote control is within the physical proximity, the controller refrains from operation of the moving-barrier imminent motion notification apparatus.

32 Claims, 10 Drawing Sheets

(52) U.S. Cl.
CPC .............. *G07C 2009/00928* (2013.01); *G07C 2209/63* (2013.01)

(56) References Cited

U.S. PATENT DOCUMENTS

| | | | |
|---|---|---|---|
| 5,565,843 | A | 10/1996 | Meyvis |
| 6,025,785 | A | 2/2000 | Farris |
| 6,167,137 | A | 12/2000 | Marino |
| 6,239,569 | B1 | 5/2001 | Fitzgibbon |
| 6,271,765 | B1 | 8/2001 | King |
| 6,278,249 | B1 | 8/2001 | Fitzgibbon |
| 6,308,083 | B2 | 10/2001 | King |
| 6,326,754 | B1 | 12/2001 | Mullet |
| 6,484,784 | B1 | 11/2002 | Weik, III |
| 6,615,132 | B1 | 9/2003 | Nagasaka |
| 6,624,605 | B1 | 9/2003 | Powder |
| 7,038,409 | B1 | 5/2006 | Mullet |
| 7,088,265 | B2 | 8/2006 | Tsui |
| 7,113,090 | B1 | 9/2006 | Saylor |
| 7,205,892 | B2 | 4/2007 | Luebke |
| 7,205,908 | B2 | 4/2007 | Tsui |
| 7,315,143 | B2 | 1/2008 | Mullet |
| 7,468,676 | B2 | 12/2008 | Styers |
| 7,493,726 | B2 | 2/2009 | Fitzgibbon |
| 7,602,283 | B2 | 10/2009 | John |
| 7,710,284 | B2 | 5/2010 | Dzurko |
| 7,869,582 | B2 | 1/2011 | Styers |
| 8,040,217 | B2 | 10/2011 | Fitzgibbon |
| 8,218,739 | B2 | 7/2012 | Styers |
| 8,410,930 | B2 | 4/2013 | Karasek |
| 8,587,404 | B2 | 11/2013 | Laird |
| 9,141,099 | B2 * | 9/2015 | Cate ........................ E05F 15/70 |
| 9,756,233 | B2 * | 9/2017 | Lee .................... H04N 5/23203 |
| 10,060,175 | B1 * | 8/2018 | Lickfelt ................... E04H 6/02 |
| 10,358,859 | B2 * | 7/2019 | Lickfelt ................ G01S 17/026 |
| 2003/0071590 | A1 | 4/2003 | Roman |
| 2003/0140107 | A1 | 7/2003 | Rezvani |
| 2004/0212498 | A1 | 10/2004 | Peterson |
| 2005/0012631 | A1 | 1/2005 | Gregori |
| 2005/0024230 | A1 | 2/2005 | Chuey |
| 2005/0176400 | A1 | 8/2005 | Mullet |
| 2005/0195066 | A1 | 9/2005 | Vandrunen |
| 2006/0158339 | A1 | 7/2006 | Brundula |
| 2007/0146118 | A1 | 6/2007 | Rodriguez |
| 2013/0147600 | A1 | 6/2013 | Murray |
| 2016/0010382 | A1 | 1/2016 | Cate |
| 2016/0194912 | A1 * | 7/2016 | Fitzgibbon .......... H04L 67/1097 340/5.61 |
| 2017/0241189 | A1 * | 8/2017 | Fitzgibbon ............. G05B 15/00 |
| 2018/0245395 | A1 | 8/2018 | Huggins |
| 2019/0010382 | A1 * | 1/2019 | Kuznetsov ............. C09K 8/584 |
| 2019/0085615 | A1 * | 3/2019 | Cate ........................ G05B 15/00 |
| 2019/0249481 | A1 | 8/2019 | Cate |
| 2019/0392691 | A1 | 12/2019 | Cheng |

OTHER PUBLICATIONS

The Genie Company, Instructions for Closed Confirm™ Remote Installation and Operation, publicly available before Jan. 24, 2019, 1 page.

U.S. Appl. No. 16/257,045, filed Jan. 24, 2019; 53 pages.

UL Standard for Safety for Door, Drapery, Gate, Louver, and Window Operators and Systems, UL 325 Fifth Edition, Dated Jun. 7, 2002; pp. 1-186.

Wayback Machine archive of https://geniecompany.com/garage-door-openers/accessories/closed-confirm-remote.aspx, website publicly available as of Oct. 28, 2016, 3 pages.

USPTO; U.S. Appl. No. 16/272,728; Office Action dated May 29, 2020, (pp. 1-30).

* cited by examiner

MOVABLE BARRIER IMMINENT MOTION NOTIFICATION SYSTEM AND METHOD

CROSS-REFERENCE TO RELATED APPLICATION

This is a continuation-in-part of U.S. patent application Ser. No. 16/257,045, filed Jan. 24, 2019, entitled MOVABLE BARRIER IMMINENT MOTION NOTIFICATION SYSTEM AND METHOD, which is incorporated by reference in its entirety herein.

FIELD

This disclosure relates generally to a movable barrier operator and, more specifically, to a movable barrier operator system with a moving-barrier imminent motion notification apparatus.

BACKGROUND

Movable barrier operators for controlling various types of barriers such as garage doors, gates, and the like are well known in the art. Some users operate these movable barrier operators using a local remote control, such as a handheld transmitter, to send a command message to open or close a movable barrier. Movable barrier operators may also receive command messages from a remote server via the internet in response to a state change request from a remote device to allow for remote operation by a user. For example, a user may control a movable barrier operator through a website accessed by a computing device or via an application on a smartphone.

When a user operates a movable barrier operator using a remote device via a network, such as the internet, the operation is typically classified as an unattended operation. Given the potential distance between the user operating a movable barrier operator through a remote device and the movable barrier itself, the user may be unaware of any individuals or pets located near the movable barrier prior to an open or close operation. In such systems, an unattended operation initiated by a remote device is performed by outputting an imminent motion notification during a delay in operation, and movement of the movable barrier after expiration of the delay. The imminent motion notification may be at least one of a flashing light and a sound alert to warn nearby individuals that the movable barrier will open or close.

Additionally, if a user operates a movable barrier using a local transmitter, the operation is classified as an attended operation which does not require an imminent motion notification. Given the short radio range of a transmitter, an imminent motion notification is generally thought to be unnecessary because the user is likely in view of the movable barrier after actuating the transmitter.

However, such methods do not account for the possibility that a user may operate the movable barrier operator using a remote device via a network when the user is near the movable barrier. For example, a user may attempt to open or close a garage door using a smartphone while in a driveway, or inside the associated garage. In these situations, the movable barrier operator system would automatically classify the operation as an unattended close (because the command message was received via a network) such that one or more of delayed operation of the movable barrier operator, flashing a light, and generating a sound alert occur, which may result in frustration by or inconvenience to a user because the notification is not required.

Further, the radio range of local transmitters continues to increase due to advances in technology. As such, a user may potentially be able to operate a local transmitter from a distance that would ordinarily entail an imminent motion notification because the user may no longer be in view of the movable barrier. In this situation, the imminent motion notification apparatus would not operate simply because a local transmitter was used, which may surprise individuals or pets near the movable barrier who are unaware that the movable barrier may soon close.

SUMMARY

In one aspect of the present disclosure, a movable barrier operator system is provided that includes a motor, communication circuitry configured to communicate with a remote control, and a controller operably coupled to the motor and the communication circuitry. Upon the communication circuitry receiving a communication from the remote control, the controller is configured to cause the motor to change a state of the movable barrier. The movable barrier operator system further includes a moving-barrier imminent motion notification apparatus operably coupled to the controller. The moving-barrier imminent motion notification apparatus is configured to output an alert in combination with the change of state of the movable barrier upon a determination of the remote control being beyond a physical proximity of a location associated with the movable barrier operator system. Upon a determination that the remote control is within the physical proximity, however, the controller refrains from operation of the moving-barrier imminent motion notification apparatus in combination with the change of state of the movable barrier.

In some embodiments, the proximity determination may be performed by the controller of the movable barrier operator system. As other examples, the proximity determination may be performed by a processor of the remote control or by a processor of a server computer associated with the movable barrier operator system and communicated to the communication circuitry of the movable barrier operator.

By performing a proximity determination prior to operation of the moving-barrier imminent motion notification apparatus, devices such as car visor-mounted transmitters may utilize an increased range of operation while still providing an imminent motion notification upon a determination that the remote control is beyond the physical proximity from the location associated with the movable barrier operator system. Additionally, if the remote control is determined to be within the physical proximity, then the moving-barrier imminent motion notification apparatus does not operate, and unnecessary imminent motion notifications can be minimized or prevented.

The proximity determination may be based on at least one or more of the following methods for obtaining proximity-related information of the remote control including, but not limited to, dead reckoning determinations, angle of arrival measurements, time of flight determinations, received signal strength indication (RSSI) thresholding, comparison of global navigation satellite system (GNSS) data such as global positioning satellite (GPS) data, analysis of data obtained via remote sensors (e.g., a camera configured to detect image data including physical characteristics of a user), LiDAR scanning, or a combination thereof. In some embodiments, proximity-related data of the remote control may be obtained from multiple sources and combined using sensor fusion algorithms to increase the accuracy of the proximity determination.

In accordance with another aspect of the present disclosure, a remote control for a movable barrier operator system is provided. The remote control includes communication circuitry configured to send a communication to the movable barrier operator system to change a state of the movable barrier. The communication circuitry is also capable of receiving or transmitting a locating indicium for determination of whether the remote control is within or beyond a physical proximity of a location associated with the movable barrier operator system. The remote control further includes a user interface configured to receive a user input that indicates a request to change the state of the movable barrier and a processor operatively coupled to the communication circuitry and the user interface. In response to a determination that the remote control is located beyond the physical proximity, the processor causes the communication circuitry to send the communication to the movable barrier operator system to change the state of the movable barrier. The processor is configured to inhibit operation of the moving-barrier imminent notification apparatus in combination with the change of state of the movable barrier upon a determination of the remote control being within the physical proximity. The processor is further configured to effectuate operation of the moving-barrier imminent motion notification in combination with the change of state of the movable barrier upon a determination of the remote control being beyond the physical proximity.

In yet another aspect of the present disclosure, a server computer for facilitating operation by a remote control of a movable barrier operator system is provided. The server computer communicates via a communication interface with both the movable barrier operator system and the remote control over a network, such as the internet, and can receive a state change request from the remote control to change the state of the movable barrier. A processor of the server computer is operatively coupled to the communication interface and is configured to cause the communication interface to communicate with the movable barrier operator system and cause a change of state of the movable barrier upon the communication interface receiving the state change request. The processor is further configured to cause the communication interface to communicate with the movable barrier operator system and inhibit operation of the moving-barrier imminent motion notification apparatus in combination with the change of state of the movable barrier operator system upon a determination of the remote control being within a physical proximity of a location associated with the movable barrier operator system. Conversely, the processor is configured to cause the communication interface to communicate with the movable barrier operator system and effectuate operation of the moving-barrier imminent motion notification apparatus in combination with the change of state upon a determination of the remote control being beyond the physical proximity.

This disclosure likewise provides for a method of operating a movable barrier operator system having a moving-barrier imminent motion notification apparatus. The method includes receiving a communication from a remote control that causes the movable barrier operator system to change the state of a movable barrier. The method includes causing the moving-barrier imminent notification apparatus to output an alert in combination with the change of state of the movable barrier upon a determination of the remote control being beyond a physical proximity of a location associated with the movable barrier operator system. Further, upon a determination that the remote control is within the physical proximity, the method includes causing the moving-barrier imminent notification apparatus to refrain from outputting an alert in combination with the change of state of the movable barrier.

In another aspect, a method is provided of operating a movable barrier operator system using a remote control. The method includes receiving a user input at a user interface of the remote control, the user input requesting a change of state of a movable barrier of the movable barrier operator system. The remote control is configured, in response to the user input, to output a communication to cause the movable barrier operator system to change a state of the movable barrier. The method includes communicating at least one locating indicium for determination or indication of whether the remote control is within or beyond a physical proximity of a location associated with the movable barrier operator system. The communication circuitry of the remote control sends a communication to the movable barrier operator system. The method includes effecting operation of the moving-barrier imminent motion notification apparatus in combination with the change of state of the movable barrier upon a determination of the remote control being beyond (e.g., relative to the at least one locating indicium) a physical proximity of the location associated with the movable barrier operator system. The method further includes inhibiting operation of the moving-barrier imminent motion notification apparatus in combination with the change of state of the movable barrier upon a determination of the remote control being within (e.g., relative to the at least one locating indicium) the physical proximity.

In accordance with yet another aspect of this disclosure, a non-transitory computer readable medium is provided having instructions stored thereon. When executed by a computer, the instructions cause the computer to perform operations including receiving a communication including a state change request from a remote control. The state change request is configured to cause a change of state of a movable barrier of a movable barrier operator system. The operations include effecting operation of a moving-barrier imminent notification apparatus in combination with the change of state of the movable barrier upon a determination of the remote control being beyond a physical proximity of a location associated with the movable barrier operator system. The operations further include inhibiting operation of the moving-barrier imminent motion notification apparatus in combination with the change of state of the movable barrier upon a determination that the remote control is within the physical proximity.

In another aspect, a movable barrier operator system is provided that includes at least one camera configured to capture image data to detect or facilitate detection (e.g., via communication with a separate resource such as one or more remote server computers and/or one or more local processing devices such as a home hub or network attached storage (NAS)) of a physical characteristic of a user and communication circuitry configured to communicate with a remote control associated with the user. The system includes an imminent motion notification apparatus configured to output an alert and a controller operably coupled to the communication circuitry and the imminent motion notification apparatus. The controller is configured to cause a change of state of the movable barrier upon the communication circuitry receiving a communication from the remote control. The controller is further configured to cause the imminent motion notification apparatus to output the alert in combination with the change of state of the movable barrier upon a determination of the remote control being beyond a physical proximity of a location associated with the movable barrier operator system based at least in part on a lack of detection of the physical characteristic of the user. Further, the controller is configured to inhibit output of the alert by the imminent motion notification apparatus upon a determination of the remote control being within the physical proximity based at least in part on the detected physical characteristic of the user. The movable barrier operator system may thereby avoid the imminent motion notification apparatus outputting an alert upon the remote control being within the physical proximity of the location as indicated by the physical characteristic of the user captured by the camera and analyzed by a processor of the camera or a separate processing resource.

The determination of whether the remote control is within the physical proximity of the location may involve a plurality of factors or criteria. For example, the remote control may be determined to be within the physical proximity of the location if the remote control is within a geofence of the location and an approval of the physical characteristic captured by the camera is received or determined. As an example, the remote control may be a smartphone of a package delivery associate, and the camera may capture an image of the package delivery associate's face. The user, e.g., the package delivery associate, may be determined to be within the physical proximity of the location if the smartphone is within a geofenced area adjacent the movable barrier operator system and the detected face of the package delivery associate is associated or reconciled with an image of a package delivery associate who is authorized to operate the movable barrier operator system. By determining whether the package delivery associate is within the physical proximity of the location, the package delivery associate may use her smartphone to close the movable barrier after a delivery without having to monitor the closing of the movable barrier. Rather, the delivery associate may send a movable barrier close request using the delivery associate's smartphone and leave to deliver another package while the movable barrier operator system closes the movable barrier. The ability of the delivery associate to leave without having to standby and monitor closing of the movable barrier may decrease the duration of the package delivery and permit the delivery associate to deliver more packages in a given period of time. In other words, the delivery associate's request to close the movable barrier sent from her smartphone may be considered a local close request so that the movable barrier operator system will close the movable barrier without an alert from the imminent motion notification apparatus and without the delivery associate having to watch the movable barrier close.

The present disclosure also provides a method of operating a movable barrier operator system having a camera and a moving-barrier imminent motion notification apparatus. The method includes capturing, via the camera, a physical characteristic of a user proximate the movable barrier. The method includes determining whether the user proximate the movable barrier is verified based at least in part on a comparison between the physical characteristic (which may be determined by the camera itself or in combination with another processing device such as a server computer) of the user and authorized user physical characteristic data. The method includes receiving, at the movable barrier operator system, a communication configured to cause the movable barrier operator system to change a state of a movable barrier. The method involves causing the moving-barrier imminent motion notification apparatus to output an alert in combination with the change of state of the movable barrier upon the user proximate the movable barrier not being verified. Conversely, upon the user proximate the movable barrier being verified, the method includes causing the moving-barrier imminent notification apparatus to refrain from outputting the alert in combination with the change of state of the movable barrier. The method permits the movable barrier operator system to avoid having to operate the moving-barrier imminent notification apparatus upon the user being verified based at least in part on the physical characteristic captured by the camera. The physical characteristic may be, for example, one or more facial features of the user, a color or type of clothing worn by the user, the user's gait, or an indicium on the clothing of the user.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/ or operations may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. Further, it is intended that the phrase "at least one of" as used herein be interpreted in the disjunctive sense. For example, the phrase "at least one of A and B" is intended to encompass only A, only B, or both A and B.

DETAILED DESCRIPTION

Figure 1:
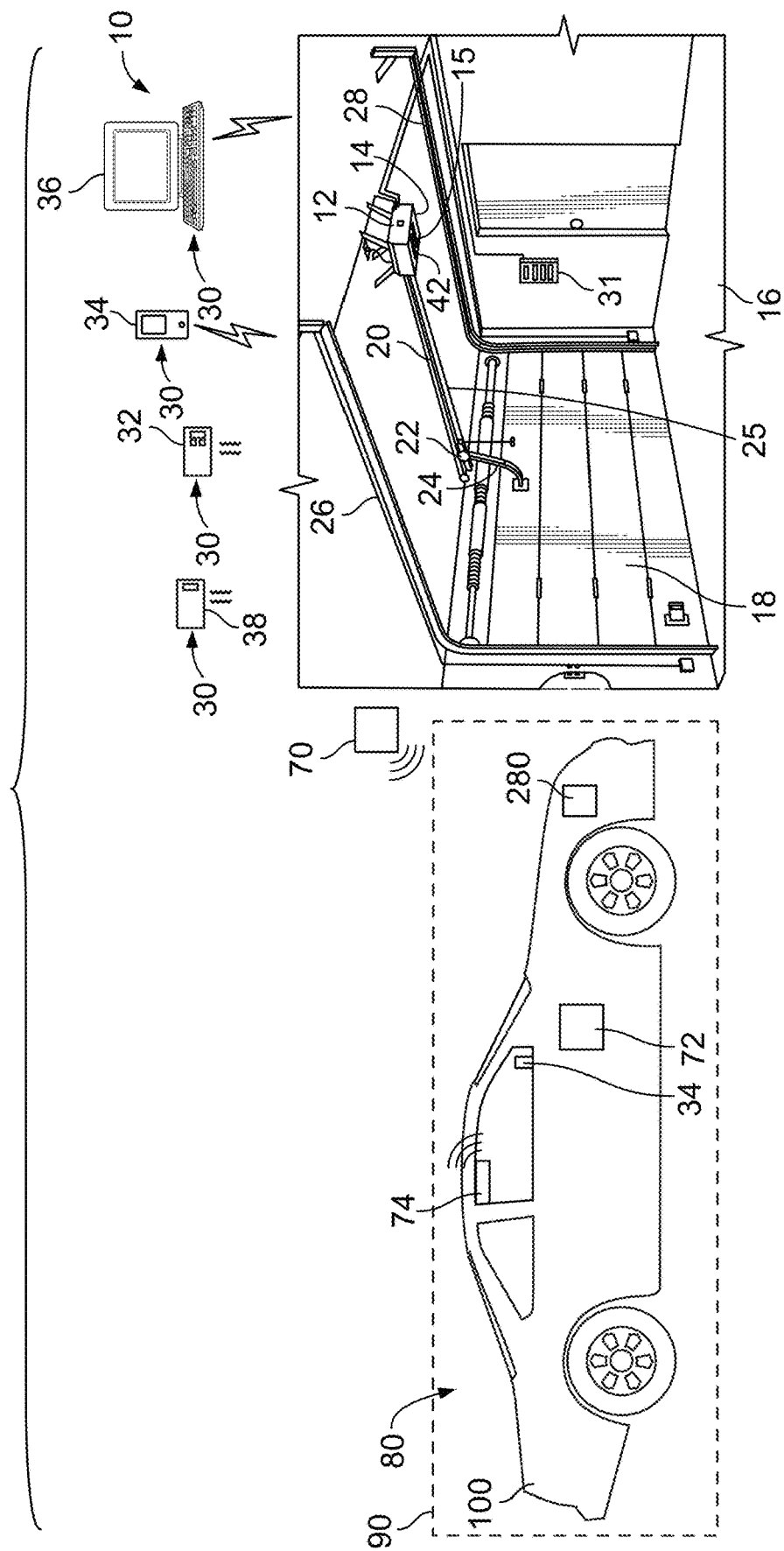
FIG. 1 is a perspective view of an example movable barrier operator system in communication with various remote controls.

Referring now to the drawings, FIG. 1 shows a movable barrier operator system 10 including a movable barrier operator 12 and a moving-barrier imminent motion notification apparatus 14. The movable barrier operator 12 is shown mounted to the ceiling of a garage 16 and controls the position of a movable barrier 18. The movable barrier operator 12 further includes a motor 260, communication circuitry 250, and a controller 255 (See FIG. 2). The movable barrier operator system 10 includes a rail 20 and trolley 22. The trolley 22 has an arm 24 that is connected to the movable barrier 18. A coupling 25 such as a belt or chain connects the trolley 22 to an output (e.g. drive shaft or transmission) of the motor 260. The movable barrier 18 is positioned for movement along a pair of door tracks 26, 28. In response to receiving a command message from a remote control 30, such as a handheld transmitter 32, the movable barrier operator 12 changes the state of the movable barrier 18. For example, the movable barrier operator 12 moves the movable barrier 18 from an open position to a closed position and vice versa.

The communication circuitry 250 of the movable barrier operator 12 is configured to communicate with one or more remote controls 30. The one or more remote controls 30 may include, for example, a wall-mounted keypad 31, a handheld transmitter 32, a mobile communication device 34 (such as a smartphone), a remote computer 36 (such as a desktop or laptop), or a vehicle integral (e.g., HomeLink®-style) transmitter 38, or a security system associated with the garage 16. The one or more remote controls 30 are configured to communicate directly or indirectly with the movable barrier operator 12 to effect a change of the state of the movable barrier 18. The remote controls 30 may send a communication that includes at least: an identifier portion to identify the remote control 30 sending the communication; and a rolling code portion that changes with each command message sent by the remote control 30. For example, the handheld transmitter 32 may send a communication that may be a radio frequency signal including a command message having an identifier portion and a rolling code portion.

The remote controls 30 may communicate directly with the movable barrier operator 12, such as with radio frequency signals. Alternatively or additionally, the remote controls 30 may communicate indirectly with the movable barrier operator 12 such as via a network 44 and a server computer 40 (see FIG. 2). The network 44 may include wired or wireless networks (or a combination thereof), for example, the internet or a local area network. For example, the handheld transmitter 32 may communicate directly with the movable barrier operator 12 via radio frequency signals such that when the handheld transmitter 32 is out of range, the movable barrier operator 12 will not receive a communication from the handheld transmitter 32 and will not effect movement of the movable barrier 18. However, the mobile communication device 34, such as a smartphone, may instead communicate indirectly with the movable barrier operator 12 to effectively increase the range of operation. Specifically, the mobile communication device 34 communicates a state change request to the server computer 40 and the server computer 40 communicates a command message to the movable barrier operator 12 via the network 44. Similarly, a remote computer 36 or a security system 38 may communicate indirectly with the movable barrier operator 12 via the network 44 and the server computer 40.

Upon receiving the command message, the movable barrier operator 12 changes the state of the movable barrier 18. The movable barrier operator 12 may additionally be configured to communicate with one or more peripheral devices. For example, the communication circuitry 250 may include one or more antennae to facilitate communication with one or more remote sensors 70, a WiFi router or access point, and other devices, as will be discussed further hereinafter.

Regarding FIG. 1, the moving-barrier imminent motion notification apparatus 14 is integrated with the movable barrier operator 12 on the ceiling of the garage 16. The moving-barrier imminent motion notification apparatus 14 may alternatively or additionally be separate or distinct from the movable barrier operator 12 and located in other areas proximate the movable barrier 18, such as a wall of the garage 16 or on the ceiling of the garage 16.

The moving-barrier imminent motion notification apparatus 14 is configured to provide an imminent motion notification that typically includes a visual alert, a sound alert, a partial movement of the barrier, or a combination thereof, followed by or concurrent with delayed movement of the movable barrier 18. In one embodiment, the moving-barrier imminent motion notification apparatus 14 is configured to cause the controller 255 of the movable barrier operator 12 to use a timer to delay operation of the motor 260 for a short period of time, for example, five seconds or more before a change of state of the movable barrier 18. Additionally, the moving-barrier imminent motion notification apparatus 14 may include a speaker 15 for emitting an audible alert for a short period of time, for example, five seconds or more before a change of state of the movable barrier 18. For example, the audible alert may include a continuous high-pitched tone, an intermittent beeping, or the like, that may be heard by nearby individuals. The moving-barrier imminent motion notification apparatus 14 may provide a visual alert by causing the controller 255 to operate an overhead light 42 of the movable barrier operator 12. For example, the visual alert may include flashing or strobing the overhead light 42 for a short period of time, for example, five seconds or more before a change of state of the movable barrier 18. So configured, the moving-barrier imminent motion notification apparatus 14 provides an imminent motion notification to alert individuals near the movable barrier 18 prior to a change of state operation.

Figure 2:
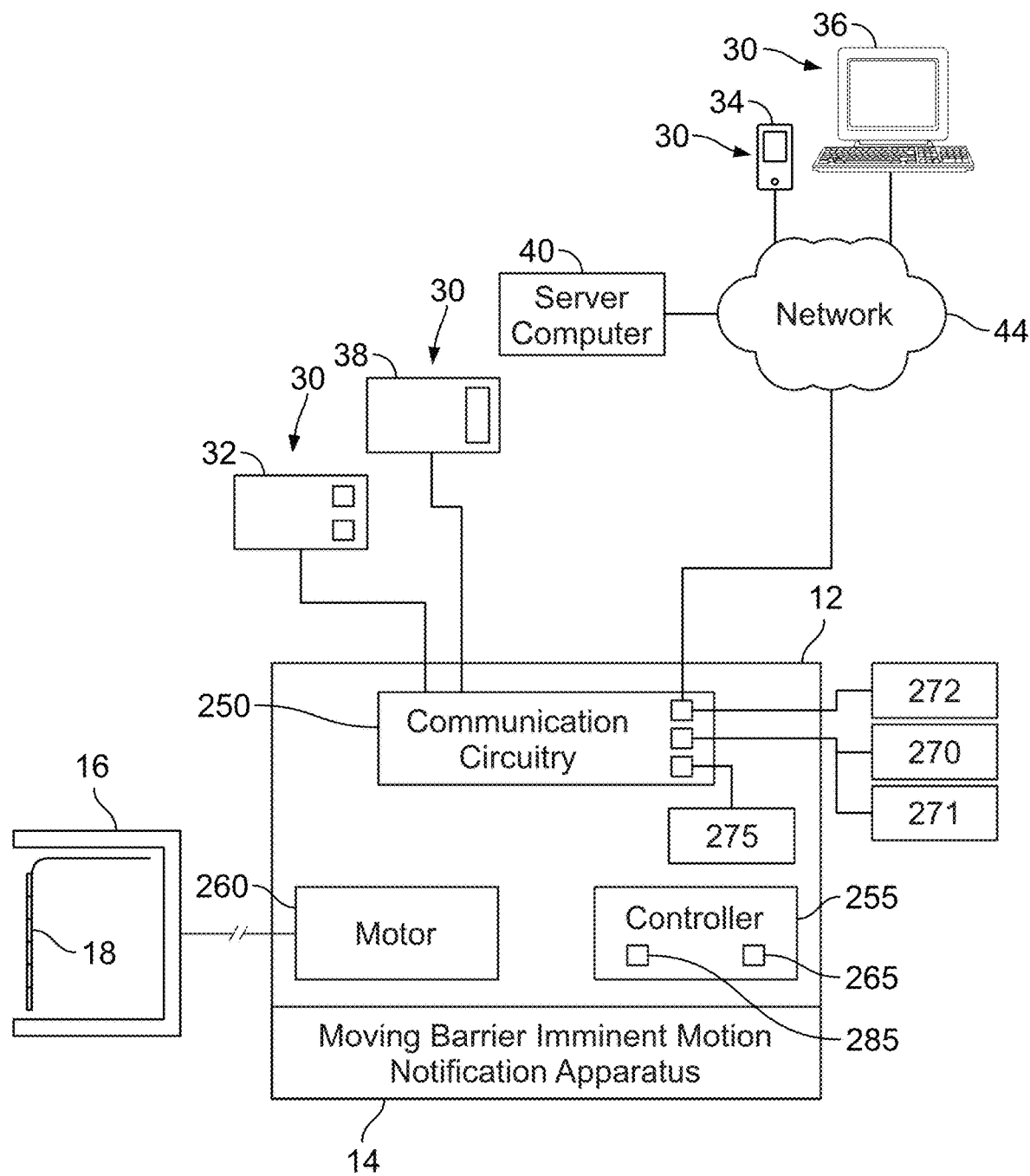
FIG. 2 is a block diagram of the movable barrier operator system of FIG. 1 showing a moving-barrier imminent motion notification apparatus of the movable barrier operator system.

Regarding FIGS. 1 and 2, the movable barrier operator system 10 moves the movable barrier 18 with or without operation of the moving-barrier imminent motion notification apparatus 14 depending on whether a particular remote control of the remote controls 30 has been actuated and is within a physical proximity of a location 80 associated with the movable barrier operator system 10. Whether the remote control 30 is within the physical proximity of the location 80 may be utilized as a proxy to determine whether a user associated with the remote control 30 is within the physical proximity of the location 80. As such, references herein to determining whether the remote control or user is within a physical proximity of a location are intended to be used interchangeably. In one embodiment, the location 80 may be a geofenced area 90 outside of the garage 16. The user's home may have a driveway extending between the garage 16 and a street and the geofenced area 90 may be, for example, a portion of the street. FIG. 1 shows a vehicle 100 that is driving through the geofenced area 90 toward the garage 16.

For example, the movable barrier operator system 10 includes communication circuitry 250 configured to receive a communication from a remote control 30 associated with the movable barrier operator system 10. Upon the communication circuitry 250 receiving the communication, the controller 255 of the movable barrier operator 12 is configured to cause the motor 260 to effect movement of the movable barrier 18. Upon a determination of the remote control 30 being beyond the physical proximity of the location 80 associated with the movable barrier operator system 10, the controller 255 additionally operates the moving-barrier imminent motion notification apparatus 14. However, upon the remote control 30 being determined to be located within the physical proximity of the location 80, then the controller 255 will cause the motor 260 to operate the movable barrier 18 without effecting operation of the moving-barrier imminent motion notification apparatus 14.

The controller 255 need not operate the moving-barrier imminent motion notification apparatus 14 upon the remote control 30 being within the physical proximity of the location 80 because the remote control 30 is substantially within a line of sight of the movable barrier 18 such that the operation is considered an attended operation. The movable barrier operator system 10 thereby makes a determination of whether to operate the moving-barrier imminent motion notification apparatus 14 based on the location of the remote control 30 rather than making the determination based solely on the type of remote control 30 (for example, whether the remote control is a local transmitter or a remote device). This avoids potential inconvenience or frustration of experiencing the delay, flashing light, and sound alarm of the moving-barrier imminent motion notification apparatus 14 when, for example, the user utilizes a mobile communication device 34 in a driveway of garage 16.

As used herein, physical proximity refers to a geographic relationship between the remote control 30 and the location 80 associated with the movable barrier operator system 10 as discussed above. For example, physical proximity may refer to a threshold distance set by a user to be compared to an absolute measured distance between GPS coordinates of the remote control 30 and GPS coordinates of the location 80 associated with the movable barrier operator system 10 to determine whether to operate the moving-barrier imminent motion notification apparatus 14. As one example in this regard, the location 80 may be the location of the garage 16. Whether the remote control 30 is within the physical proximity of the location 80 is determined by comparing the absolute distance between the remote control 30 and the location 80 to a threshold distance. As another example, the location 80 may be defined as a bounded area (e.g., geofenced area 90) associated with the movable barrier operator system 10, and physical proximity may refer to the remote control 30 being located within the bounded area.

The proximity between the remote control 30 and movable barrier 18 may, in some cases, be represented by a route other than a direct path. For example, some routes that a user in a vehicle 100 with the remote control 30 may be required to take to arrive within a substantial line of sight of the movable barrier 18 may be lengthy or convoluted such as a winding street, a one-way street, or a circuitous route in a gated community. In those instances, the remote control 30 may be determined to be within the absolute threshold distance of the location 80, but the remote control 30 may still not be in a substantial line of sight of the movable barrier 18 such that an imminent barrier notification is still output in combination with a change of state operation. For example, if the location 80 is the location of the garage 16, the remote control 30 may be located one street over from the movable barrier 18 in a dense subdivision and not be in a substantial line of sight of the movable barrier 18 even though the remote control 30 is relatively close to the garage 16. To address this, whether the remote control 30 is within the physical proximity of the location 80 may be determined by first determining a distance the vehicle 100 carrying the remote control 30 would have to travel along one or more roads to arrive at the location 80. This vehicle travel distance may be retrieved real-time from a navigation system of the vehicle 100 or the remote control 30 or, as another example, may be predicted based on the current location of the vehicle 100 or remote control 30 and a known vehicle travel distance between the current location and the location 80. Next, the travel distance is compared to a threshold travel distance to determine whether the remote control 30 is within the physical proximity of the location 80.

In some embodiments where location 80 is defined as a bounded area, the location of the remote control 30 may be determined at multiple intervals within location 80 to predictively determine whether the remote control 30 is moving nearer or farther away from the movable barrier 18. If the determination indicates that the remote control 30 is moving towards the movable barrier 18, operation of the moving-barrier imminent motion notification apparatus 14 may not be required. However, if the determination indicates that the remote control 30 is moving away from the movable barrier 18, even if the remote control 30 is still within the area, operation of the moving-barrier imminent motion notification apparatus 14 may nevertheless be required. For example, the GPS coordinates of the remote control 30, as the remote control 30 enters the bounds of the location 80, may be used to determine a direction of travel of the vehicle 100 including the remote control 30.

A user may define the geofenced area 90 using, for example, the remote computer 36. The geofenced area 90 may be defined as a driveway associated with the garage 16, the street address of a house including the garage 16, or the boundaries of the garage 16 itself, among others. The location 80 may alternatively be defined as a set of latitude and longitude coordinates. For example, if the remote control 30 includes an in-vehicle human machine interface (such as infotainment system 72) connected to a universal transmitter, the human-machine interface may prompt a driver to press a virtual button during setup to allow the global positioning satellite (GPS) system of the vehicle 100 to identify the location of the garage 16 or driveway associated therewith. The GPS location may then be saved in a memory of the human-machine interface for subsequent operation and may be communicated to the movable barrier operator 12 or server computer 40.

By way of example, in a densely packed urban area, the bounds of the geofenced area 90 may be defined by the user as the street on which garage 16 is located. This would effectively preclude operation of the movable barrier 18 by the remote control 30 without operation of the moving-barrier imminent motion notification apparatus 14 from locations where the remote control 30 may be within an absolute threshold distance from the movable barrier 18, but may not have a substantial line of sight of the movable barrier 18 (for example, one street over from the garage 16 or a nearby alleyway). In this embodiment, physical proximity refers to whether the GPS coordinates of the remote control 30 indicate that the remote control 30 is within the bounds of the geofenced area 90 as defined by a user.

In some embodiments, the determination of whether the remote control 30 is within the physical proximity of the location 80 associated with the movable barrier operator system 10 may be made by the controller 255 of the movable barrier operator 12. The controller 255 may include a memory 265 that comprises a non-transitory computer-readable medium. The controller 255 may also include a processor 285 operably coupled to the memory 265 and configured to execute computer-readable instructions stored in the memory 265.

The controller 255 may be configured to determine whether the remote control 30 is within the physical proximity of the location 80 based at least in part on data obtained by any technique for obtaining proximity-related information of the remote control 30 including, but not limited to, dead reckoning determinations, angle of arrival measurements, time of flight measurements, received signal strength indication (RSSI) thresholding, comparison of global navigation satellite system (GNSS) data such as GPS data, analysis of data obtained via one or more remote sensors (e.g., a camera configured to capture and/or detect image data including one or more physical characteristics of a user), LiDAR scanning, LORAN or a combination thereof. Alternatively, the communication circuitry 250 may receive data representative of a proximity determination already made by another device such as, for example, a processor 355 (See FIG. 3) of the remote control 30 or a processor 455 (See FIG. 4) of the server computer 40.

For example, the controller 255 may determine whether the remote control 30 is located within or beyond the physical proximity of the location 80 through RSSI thresholding. The signal strength of a radio frequency communication from the remote control 30 will decrease as the distance between the remote control 30 and location 80 increases. In this embodiment, the controller 255 of the movable barrier operator 12 may include the memory 265 for storing a threshold signal strength corresponding with a physical distance between the remote control 30 and the location 80 wherein an imminent motion notification would typically be output. Upon the communication circuitry 250 receiving a radio frequency communication from a remote control 30, the controller 255 is configured to retrieve the threshold signal strength from the memory 265 and compare the received signal strength of the communication with the threshold signal strength. Upon the comparison indicating that the received signal strength of the communication is below the threshold, the remote control 30 is determined to be beyond the physical proximity, and the controller 255 will effect operation of the moving-barrier imminent motion notification apparatus 14 in combination with a change of state of the movable barrier 18. Conversely, when the received signal strength is above the threshold, the controller 255 will not effect operation of the moving-barrier imminent motion notification apparatus 14, and will instead operate the movable barrier 18 without an imminent motion notification.

In embodiments where the proximity determination is calculated by an angle of arrival of the communication from the remote control 30, at least two sensors 270, 271 having antennae may be associated with the movable barrier operator system 10. Upon the remote control 30 communicating the command message to the communication circuitry 250 of the movable barrier operator 12, the controller 255 is configured to determine a direction and distance of the remote control 30 relative to the sensors 270, 271 based at least in part on the time of arrival of the command message at each individual sensor 270, 271. The direction and the distance determined using the angle of arrival sensors 270, 271 may then be used either alone or in combination with other proximity-related information by the controller 255 to perform the proximity determination and determine whether the remote control 30 is located within or beyond the physical proximity of the location 80.

The movable barrier operator 12 may also include one or more time of flight sensors 272. Each time of flight sensor 272 may employ a variety of signals including, but not limited to, ultrasound/ultrasonic and infrared signals for determining whether the remote control 30 is within or beyond the physical proximity of the location 80 associated with the movable barrier operator system 10. For example, the time of flight sensor 272 may emit infrared light at a first time, $T_1$, which may be reflected by a vehicle 100 (see FIG. 1) including the mobile communication device 34, and received back at the time of flight sensor 272 at a second time, $T_2$. The controller 255 may then perform a time of flight calculation based at least in part on the time between $T_1$ and $T_2$ to approximate the distance between the time of flight sensor 272 and the vehicle 100 including the remote control 30. The controller 255 may then compare that distance to a threshold distance stored in the memory 265 to determine whether the remote control 30 is within or beyond the physical proximity of the location 80 associated with the movable barrier operator system 10. Phase shift or frequency shift of an emitted signal from time of flight sensor 272 and a reflected/received signal may additionally or alternatively be employed for the determination of physical proximity.

A variety of remote sensors 70 may be used to obtain data for determining whether the vehicle 100 including the remote control 30 is within or beyond the physical proximity of the location 80 associated with the movable barrier operator system 10. For example, an optical emitter and an optical detector may be located on opposing sides of a driveway and may be used to determine whether vehicle 100 including the remote control 30 is positioned thereupon. For example, if vehicle 100 including the remote control 30 interrupts a light beam between the optical emitter and optical detector, the emitter and/or detector may communicate with the communication circuitry 250 of the movable barrier operator 12 to indicate that the remote control 30 is within the physical proximity. To prevent false positives associated with other objects interrupting the light beam, such as a dog or child, the controller 255 may only inhibit operation of the moving-barrier imminent motion notification apparatus 14 if the light beam is interrupted within a defined time period after a user sends a command message using the remote control 30. For example, if the light beam is not interrupted within 1-3 milliseconds upon the communication circuitry 250 receiving the radio frequency communication from the remote control 30, then the moving-barrier imminent motion notification apparatus 14 will operate and provide an imminent motion notification.

Additionally, the remote sensors 70 may be integrated as part of a connected or "smart" city. For example, a number of different remote sensors 70 may be used to determine the location of the vehicle 100 including the remote control 30 as the vehicle 100 traverses through the city. The vehicle 100 including the remote control 30 may include an emitter 74 for emitting a radio frequency beacon signal having a unique identifier associated with the vehicle 100 such that a remote sensor 70 may detect the beacon signal. Such a remote sensor 70 may be located, for example, in streetlights, street signs, on a building, or other fixed or mobile devices configured for vehicle-to-vehicle (V2V), vehicle-to-infrastructure (V2I), vehicle-to-anything (V2X) communications and the like. Once the beacon signal is detected, the identity of the remote sensor 70 and an indication that the remote sensor 70 detected the vehicle 100 is communicated to the communication circuitry 250 of the movable barrier operator 12. The controller 255 may then determine the location of the vehicle 100 based at least in part on the location of the remote sensor 70 stored in the memory 265.

The remote sensor 70 may also include an optical sensor configured to detect a light emitted by the remote control 30 or by the vehicle 100. The remote control 30 may include a light emitter to emit light in response to a user interacting with the user interface 352 of the remote control 30 such that the optical sensor may detect the emitted light. The remote sensor 70 may then communicate to the communication circuitry 250 that the light was detected by the optical sensor of the remote sensor 70, thus indicating that the remote control 30 is in an unobstructed line of sight of the movable barrier 18 and causing the controller 255 to not operate the moving-barrier imminent motion notification apparatus 14.

As another example, the remote sensor 70 may be a camera such as a closed-circuit television camera that may be located at various intersections throughout a city, and a processor associated therewith may determine the relative location of a vehicle 100 including a remote control 30 based at least in part using image recognition technology. Additionally, the location of the camera or cameras may be stored in the memory 265 of the movable barrier operator 12. For example, the remote control 30 may be integrated in the vehicle 100 and the vehicle 100 has a unique license plate that may be identified by the processor associated with the camera to determine that the vehicle 100 is near the camera. An indication of the vehicle 100 being in proximity to the camera may then be transmitted to the communication circuitry 250 of the movable barrier operator 12. Based on the location of the camera that has been stored in the memory 265, the controller 255 can determine the location of the vehicle 100. If the location of the vehicle 100 including the remote control 30 is determined to be beyond the physical proximity of the location 80 associated with the movable barrier operator system 10, the moving-barrier imminent motion notification apparatus 14 will operate in combination with any change in state of the movable barrier 18.

Figure 8:
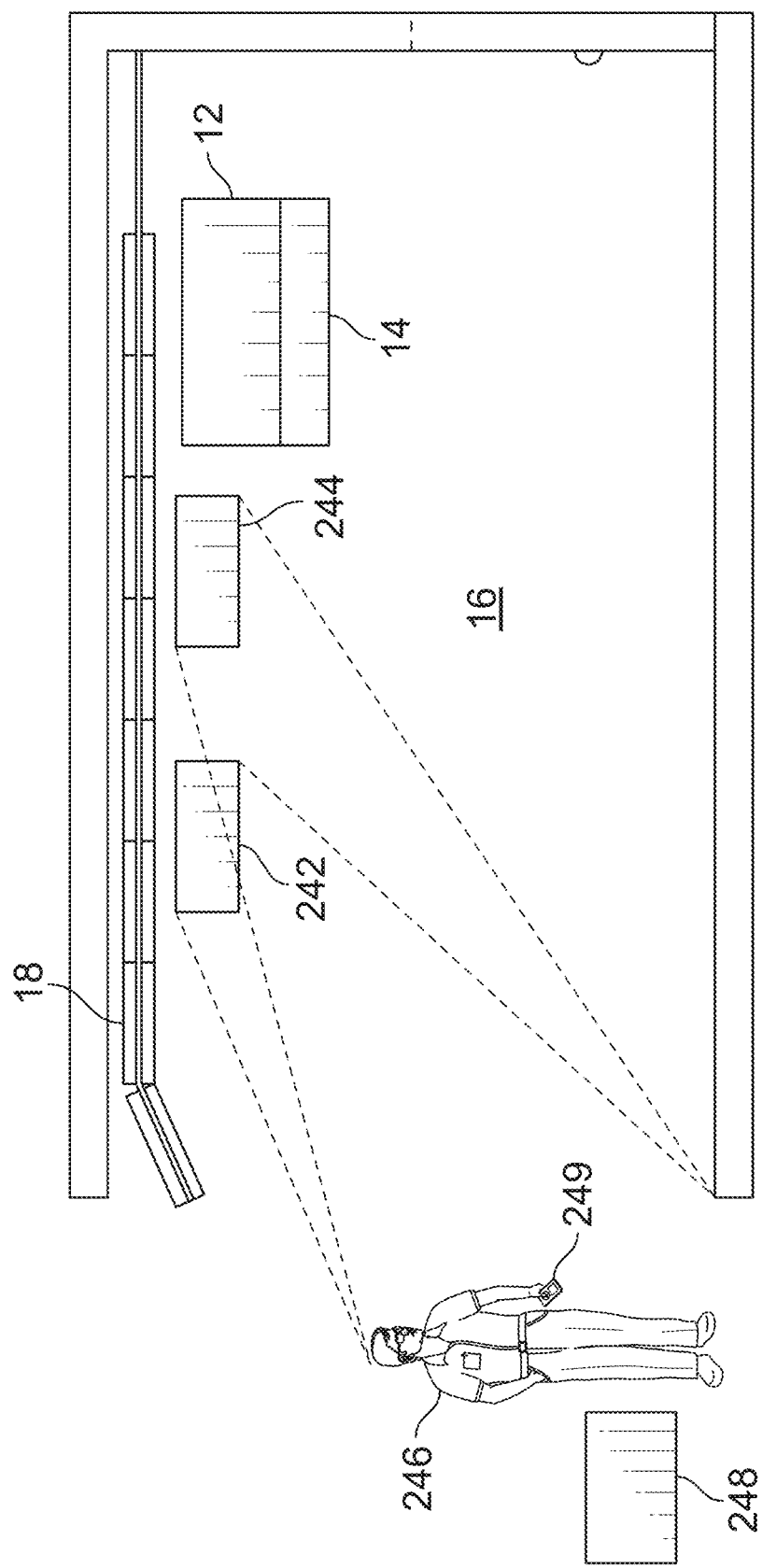
FIG. 8 is schematic view of an example garage environment including a movable barrier operator configured to move a movable barrier, an imminent motion notification apparatus, and two cameras associated with the movable barrier operator that are configured to capture a physical characteristic of a user.
Figure 9:
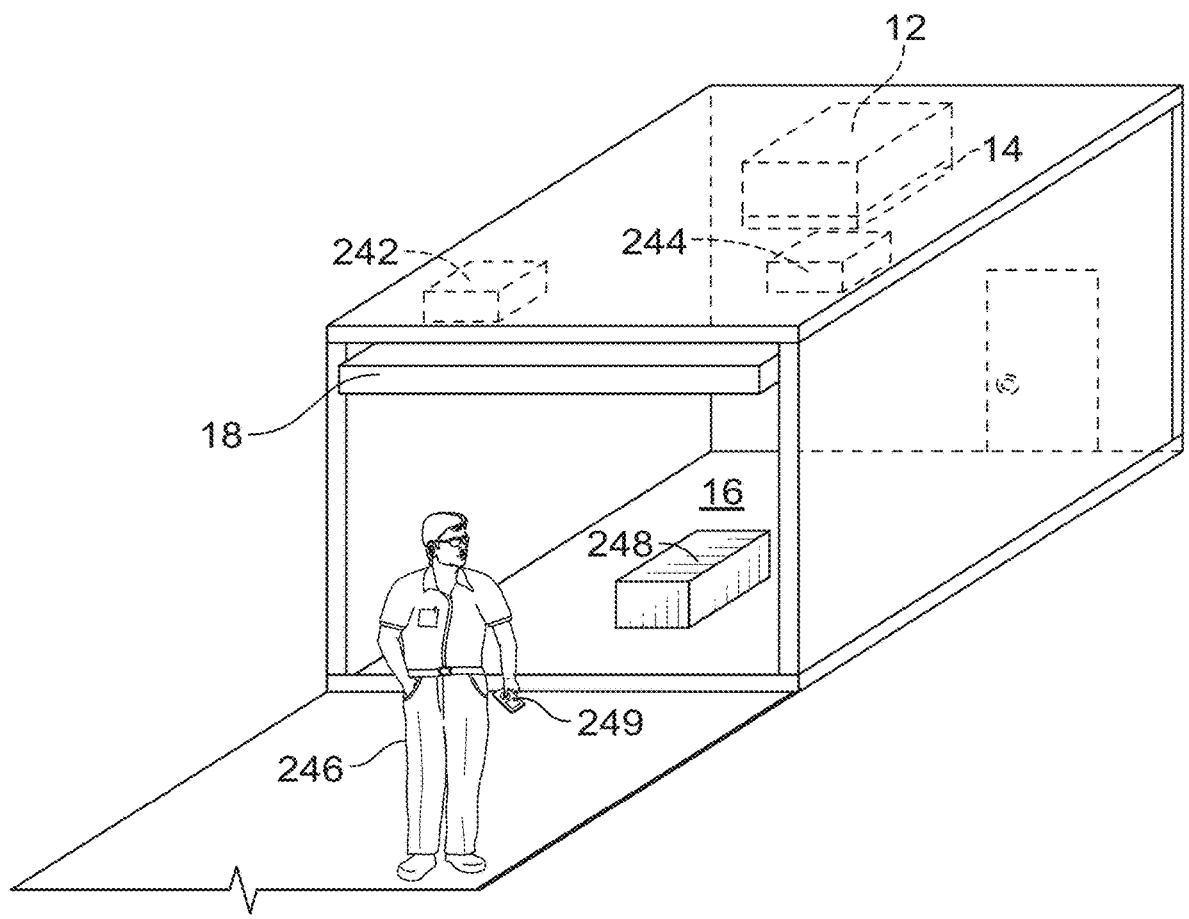
FIG. 9 is a perspective view of the garage environment of FIG. 8 after the user has dropped off a package within the garage.
Figure 10:
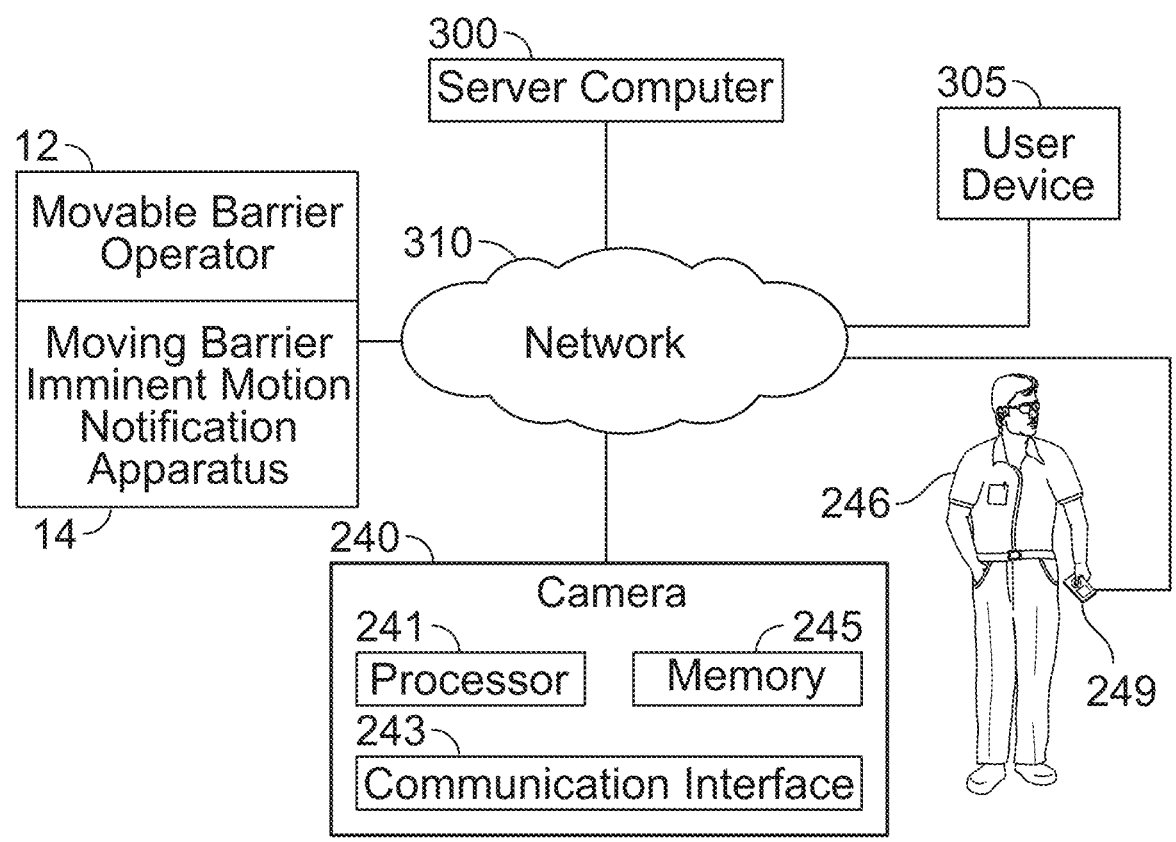
FIG. 10 is a schematic view of a movable barrier operator communicatively coupled to at least one camera, a server computer, a device associated with the homeowner, and a remote control of a user.

Regarding FIGS. 8-10, in other forms, the remote sensor 70 may include at least one camera 240 (FIG. 10) configured to capture image data. Such image data may include a video feed, or one or more frames captured by the camera 240. The camera 240 may be further configured to provide image recognition operability either alone or in combination with a separate processing device such as a server computer, home integrated hub, NAS server, movable barrier operator 12, or the moving barrier imminent motion notification apparatus 14 (in forms where the moving barrier imminent motion notification apparatus 14 includes a processor). The camera 240 may capture images and/or video and may provide streaming video to a remote computer such as a server computer 300. The server computer 300 may include one or more server computers, such as a server computer of a manufacturer of the movable barrier operator 12 and a server computer of a service provider or other third party desiring access to the garage 12 (and/or attached residence) via the movable barrier 18. The video captured by the camera 240 may be taken at a rate of, for example, 30 to 60 frames per second. In some forms, the field of view of the camera 240 includes the area inside and/or outside of a secured area, such as a garage of a residence. When a user, such as a delivery person 246 or a resident, enters the field of view of the camera 240, the image data captured by the camera 240 may include or otherwise be used to determine one or more physical characteristics of the user.

As shown in FIG. 10, the camera 240 may include a processor 241, a communication interface 243, and a memory 245. In some forms, the camera 240 may be configured to analyze the image data, such as comparing the detected physical characteristic to an authorized physical characteristic, and determine whether the user is verified to control the movable barrier operator 12. Additionally or alternatively, the camera 240 may communicate the image data to a separate processing device or entity to be analyzed. In still other forms, the camera 240 may be configured to perform at least a portion of the processing (e.g., the camera 240 may perform facial detection or other preliminary processing) and communicate the image data or detected facial features to another device for further processing (e.g., identity recognition based at least in part on the facial detection performed by the camera).

The determination of whether a user is verified may be utilized as a factor in determining whether the remote control 30 is within a physical proximity of the location 80 and whether activation of the moving-barrier imminent motion notification apparatus 14 is required. As another example, the physical characteristic of the user may be the distance of the user from the camera 240 and either the camera 240 or a separate processing device may determine whether the user is within a physical proximity of the location 80 associated with the movable barrier operator system 10 based on the distance of the user from the camera 240. Alternatively or additionally, the camera 240 may communicate, via the communication interface 243, image data to the movable barrier operator 12 and/or the server computer 300 so that the movable barrier operator 12 and/or server computer 300 may analyze image data from the camera 240 as described above.

As an example, upon receiving the captured image data from the camera 240, the controller 255 (FIG. 2) of the movable barrier operator 12 may determine that the user is within a line of sight of the movable barrier 18 based at least in part upon detection of the user looking at the at least one camera 240. If the controller 255 determines that the user is within a line of sight of the movable barrier 18, the operation may be classified as an attended or local operation such that activation of the moving-barrier imminent motion notification apparatus 14 is not required. Alternatively or additionally, the movable barrier operator 12 may be configured to determine whether the user is a verified user based at least in part on the detected physical characteristic, as described in further detail below.

Operation of the camera 240 incorporating image recognition technology will be described with respect to FIGS. 8-10 showing an example embodiment where the user associated with the remote control 30 is a package delivery associate or delivery person of a delivery services company.

Regarding FIG. 8, a delivery person 246 is proximate the garage 16 with a parcel, item or package 248 to be delivered therein. In order to change the state of the movable barrier 18, the delivery person 246 has a remote control 30 (see FIGS. 1-4) in the form of a tablet or smartphone 249 to send a communication to the movable barrier operator 12. As shown, the movable barrier 18 is in an open position. In the illustrated form, the camera 240 includes two cameras 242, 244 positioned proximate the garage 16 and communicatively coupled to the movable barrier operator 12. In some embodiments, the cameras 242, 244 may be spaced from one another such that a greater field of view is provided. So configured, the cameras 242, 244 may capture image data from which one or more physical characteristics of the delivery person 246 may be determined by either a processor of the cameras 242, 244 or a separate processing device (e.g., a remote server computer, movable barrier operator 12, moving barrier imminent motion notification apparatus 14, a home integrated hub, or a NAS server).

In embodiments including two cameras 242, 244 (or more than two cameras), each camera may include its own processor such that each camera 242, 244 may capture and detect physical characteristics of a user independently. In other forms, the camera 240 may alternatively include two separate lenses such that the camera 240 may capture image data from each separate lens in a similar manner as an embodiment including two separate cameras.

After placing the package 248 within the garage 16, as shown in FIG. 9, the delivery person 246 may send a close command to the movable barrier operator 12 via the smartphone 249 to close the movable barrier 18. Upon receiving the close command, the controller 255 of the movable barrier operator 12 may analyze the image data captured by the cameras 242, 244 to determine whether the delivery person 246 and smartphone 249 therewith are within the physical proximity such that an imminent motion notification is not required. For example, the image data may include a detected physical characteristic such as one or more facial features of the delivery person 246. Upon receiving the image data, the controller 255 may determine whether the delivery person 246 is looking at a component of the movable barrier operator system 10, such as the movable barrier 18, by analyzing the detected facial features. For example, if the controller 255 determines the entire face of the delivery person 246 is visible in the field of view of one of the cameras 242, 244, the delivery person 246 may be determined to be looking at the one camera 242, 244.

Upon the controller 255 determining that the delivery person 246 is looking at one of the cameras 242, 244, the controller 255 considers the delivery person 246 to be in a line of sight of the movable barrier 18 which is in front of the cameras 242, 244. Because the delivery person 246 is in the line of sight of the movable barrier 18, the controller 255 can determine that the close command from the smartphone 249 is a local close command and that the closing of the movable barrier 18 is an attended closing. Thus, the controller 255 determines that the delivery person 246 is within a physical proximity of the location 80 and may close the movable barrier 18 without causing operation of the moving-barrier imminent motion notification apparatus 14.

Conversely, when the controller 255 determines that the delivery person 246 is not looking at one of the cameras 242, 244 when a close command is received, or that the delivery person 246 has not been identified within a defined interval of time, the operation may be classified as an unattended close. The controller 255 determines that the delivery person 246 is outside of the physical proximity of the location 80 and may cause the moving-barrier imminent motion notification apparatus 14 to output an alert. The image recognition and other processes may be performed in whole or part at one or more of the movable barrier operator 12, camera 240, and the server computer 300. For example, one or more operations involved in determining one or more physical characteristics of a delivery person 246 using data from the camera 240 may be performed via at least one of the controller 255 of the movable barrier operator 12, the processor 241 of the camera 240, and the server computer 300.

The one or more physical characteristics of the delivery person 246 detected by the camera 240 may include any number of characteristics. For example, the physical characteristic may include at least one of a height, facial features, a gait, a position, an article of clothing, an item held by the user, an indicia of the user or an indicia of an item held by the user, a symbol (e.g., a corporate logo, QR code, or other geometric shape), a retroreflective symbol (e.g., held by the user, affixed to the user's clothes, or part of a wearable accessory), among others. In other forms, the physical characteristic may be determined via machine learning to extract a feature vector representative of one or more physical characteristics. Such a feature vector may be representative of one or more physical characteristics that a neural network has detected in an image or video captured by the camera 240. For example, such machine learning may incorporate deep-learning using a deep neural network.

The determination of whether the remote control 30 is within or beyond a physical proximity of the location 80 associated with the movable barrier operator system 10 may involve determining whether the delivery person 246 is a verified user based at least in part on the detected physical characteristic. Verification may be desirable to, for example, determine or disambiguate an identity of the delivery person 246 and/or determine whether the delivery person 246 is within the physical proximity. For instance, the processor 241 of the camera 240 may be configured to compare the user physical characteristic detected by the cameras 242, 244 to authorized user physical characteristic data stored in the memory 265 to determine whether the delivery person 246 is verified. If the delivery person 246 is verified, the movable barrier operator 12 may close the movable barrier 18 without the moving barrier imminent motion notification apparatus 14 generating an alert and the movable barrier operator 12 may close the movable barrier 18 without the delivery person 246 having to monitor the closing. The delivery person 246 may depart upon initiating closing of the movable barrier 18 which reduces the time the delivery person 246 has to spend at the garage 16.

The authorized user physical characteristic data may include, for example, one or more profiles of authorized users including known or previously detected physical characteristics such that presently detected physical characteristics of a user may be compared thereto. As an example, the profile of an authorized user may include data representative of the user's face, height, gait, and/or uniform. In some forms, the authorized user physical characteristic data may be provided by a delivery services company associated with the delivery person 246.

In one example where the physical characteristic includes facial features, the processor 241 of the camera 240 may be configured to compare the facial features of the delivery person 246 captured by the camera 240 to facial features of an authorized delivery person 246 (e.g., facial features in a user a profile provided by the delivery services company). If the captured facial features and the facial features in the profile match, the processor 241 of the camera 240 causes the communication interface 243 to send a communication to the controller 255 of the movable barrier operator 12 indicating that the delivery person 246 is a verified user. In other embodiments, the controller 255 of the movable barrier operator 12 and/or the server computer 300 may perform some or all operations constituting analyzation of the image data from the camera 240 and/or determination of whether the user is verified.

Upon a determination of the delivery person 246 being verified, the movable barrier operator 12 may be configured to change a state of the movable barrier 18 without causing operation of the imminent motion notification apparatus 14. In another example, the controller 255 of the movable barrier operator 12 will change a state of the movable barrier 18 without causing operation of the imminent motion notification apparatus 14 only if multiple factors are satisfied. For example, the controller 255 may only cause a change of the state of the movable barrier 18 if the delivery person 246 is verified using image data captured by the camera 240 within a set time period, such as five minutes, of the smartphone 249 entering a geofenced area near the movable barrier 18. The controller 255 of the movable barrier operator 12 may receive a communication from the server computer 300 via a network 310 (FIG. 10) that indicates the smartphone 249 is within the geofenced area. As another example factor, the controller 255 may have to determine that the delivery person 246 is within a line of sight of the movable barrier 18 before determining the smartphone 249 is within the predetermined proximity of the location 80. Other factors may be considered in determining whether the smartphone 249 is within the predetermined proximity of the location 80, such as RSSI thresholding.

Referring now to FIG. 10, a schematic view is provided of the movable barrier operator 12 communicatively coupled to the at least one camera 240, the server computer 300, a primary device 305 associated with an individual (e.g., a homeowner or resident of the premises) associated with the movable barrier operator 12, and the smartphone 249 of the delivery person 246 via the network 310. In one embodiment, the camera 240 is a component of the movable barrier operator 12. The network 310 may include one or more networks, for example, at least one long-range network such as a cellular network, a short-range network such as a Wi-Fi network, and the internet. In some embodiments, the authorized user physical characteristic data may be received from the server computer 300, which may include a server or plurality of servers associated with the delivery services company. The authorized user physical characteristic data may be stored in the memory 265 of the movable barrier operator 12, the memory 245 of the camera 240, and/or the server computer 300. The authorized user physical characteristic data may only be stored temporarily in the memory 265 or memory 245. For example, the authorized user physical characteristic data may be deleted from the memory 265 or memory 245 after a period of time, such as five minutes. The period of time may be triggered by one or more events, such as the smartphone 249 entering a geofenced area and/or the delivery person 246 causing the smartphone 249 to send a close command to the movable barrier operator 12. In some forms, the controller 255 of the movable barrier operator 12 may be configured to communicate a notification indicating either a successful or unsuccessful verification to the primary device 305 associated with the resident.

In still other forms, the at least one camera 240 or movable barrier operator 12 may be configured to communicate the captured image data, the detected physical characteristic, or information representative of the detected physical characteristic to the server computer 300. In such forms, the server computer 300 may perform the comparison to known authorized user physical characteristic data. The server computer 300 may then send a verification communication indicative of whether the delivery person 246 is verified to the movable barrier operator 12. The controller 255 of the movable barrier operator 12 may then determine whether the user is within the physical proximity based at least in part on receipt of the verification communication.

The detection of the physical characteristic via the cameras 242, 244 and the verification of the delivery person 246 limits delay and avoids an alert (e.g., flashing light and/or sound alarm) of the moving-barrier imminent motion notification apparatus 14 when, for example, the delivery person 246 has finished delivering the package 248 and is proximate or on a driveway of garage 16. Although the embodiments described with respect to FIGS. 8-10 refer to detection of physical characteristics and verification of a delivery person 246, such detection and verification can be performed on any user associated with the movable barrier operator system 10 (e.g., an owner of the garage 16, a guest, another service provider, etc.).

As an example in this regard, data representative of a homeowner's gait may be stored in the memory 245. If the homeowner walks through the field of view of the camera 240 and uses his smartphone to close the movable barrier 18, the processor 241 of the camera 240 compares a person's gait captured by the camera 240 to the stored data representative of the homeowner's gait. If there is a correspondence between the detected gait and the stored, known/authorized gait of the homeowner, the processor 241 sends a communication to the processor 255 of the movable barrier operator 12 indicating the person in the field of view is verified, e.g., the authorized homeowner. The controller 255 of the movable barrier operator 12 may then close the movable barrier 18 without operating the moving barrier imminent movement notification 14 because the presence of the homeowner in or near the garage 16 was confirmed by the camera 240.

Figure 11:
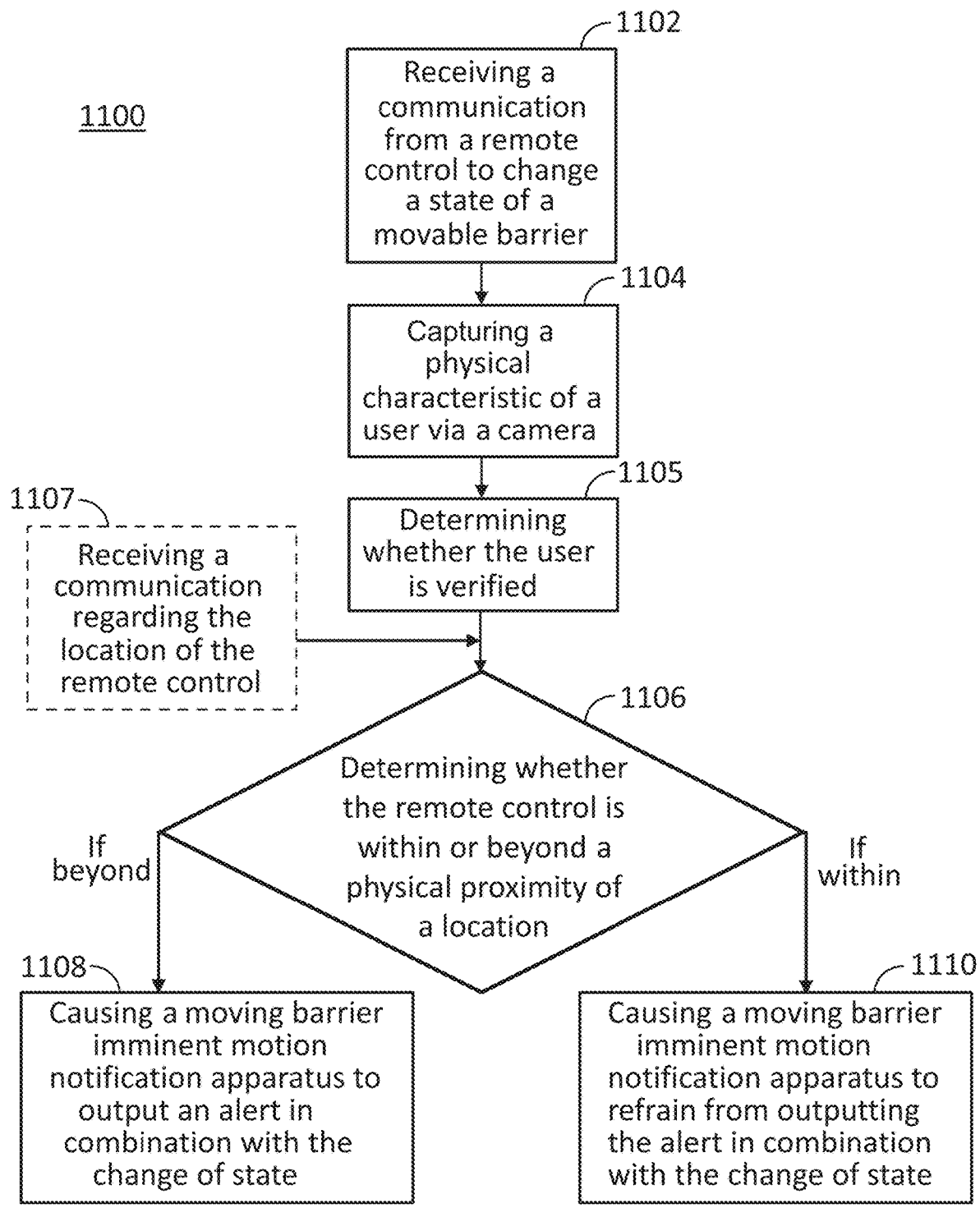
FIG. 11 is a flow chart of an example method for operating a movable barrier operator system having a moving-barrier imminent motion notification apparatus.

With reference to FIG. 11, an example method 1100 is provided for operating the movable barrier operator 12 using the remote control 30 wherein the physical proximity determination is based at least in part on a detected physical characteristic of the user. The user may be, for example, the delivery person 246 or a resident.

The method 1100 includes receiving 1102 a communication from a remote control 30, such as smartphone 249. The remote control 30 is configured to cause the movable barrier operator 12 to change a state of the movable barrier 18. For example, the remote control 30 may automatically send a state change request communication to the movable barrier operator 12 upon the remote control 30 leaving a geofenced area of the location 80. As another example, the remote control 30 sends a state change request communication to the movable barrier operator 12 upon the user providing an input to a user interface, such as pressing a "close" virtual button displayed on a touchscreen of the remote control 30.

The method 1100 includes detecting 1104 a physical characteristic of a user via a camera, such as camera 240. In some forms, the physical characteristic may be, for example, a distance of the user from the camera 240. For example, if the camera 240 includes cameras 242, 244 (or two separate lenses as described above), the controller 255 may be configured to triangulate a position of the user based on detected image data of the cameras 242, 244. The controller 255 may be configured to compare the position of the user in the image data detected by both cameras 242, 244 and the relative distance between the cameras 242, 244 to identify the position of the user. Additionally or alternatively, the image feed from the cameras 242, 244 may be extracted such that a three-dimensional reconstruction (stereo vision) of the environment may be obtained. The stereo vision may then be used to determine the positioning of the user relative to the garage 16 or movable barrier operator 12.

The position of the user may alternatively be determined via machine learning using a single camera. For example, image data of the camera may be analyzed using a convolutional deep neural network to extract motions and/or behaviors of the user. Once the deep neural network has been trained to detect to the position of the garage 16 and garage door 18, the position of the user may be estimated relative to the garage space and garage door 18 to determine whether an imminent motion notification would be required.

In yet another form, the position of the user may be determined using structured-light vision. For example, a structured pattern of light may be emitted from a light source on or proximate the camera 240 and the interaction of the light with the environment can be used to estimate a depth of each pixel thereof. The estimated depths may then be used to estimate distance and position of various objects or individuals (e.g., the user). Such structured-light vision determinations may be used in connection with stereo vision, or other methods, to improve the accuracy of such positioning estimates.

In other forms, the camera 240 may be positioned or set up proximate an entry of the garage 16 near garage door 18 such that the user is only in view of the camera when the user is outside of the garage environment. So configured, the position of the user may be approximately determined as at least outside of the garage 16, which may be utilized in connection with the above-described positioning determinations.

In one embodiment, the method 1100 includes determining 1105 whether the user is verified. The determination 1105 may include comparing the physical characteristic detected by the camera 240 at operation 1104 to authorized user physical characteristic data. For example, the determination 1105 may involve comparing one or more detected facial features of a user detected by the camera 240 to one or more facial features of an authorized user, such as an authorized package delivery person 246 or the homeowner. In one form, the camera 240 is configured to receive the authorized user physical characteristic data of the user from the server computer 300 and store the data in the memory 245 of the camera 240. The memory 245 may only store the authorized user physical characteristic data temporarily, with the processor 241 of the camera 240 deleting the authorized user physical characteristic data from the memory 245 after a predetermined period of time (e.g., about 10 minutes).

In other forms, the movable barrier operator 12 in communication or associated with the camera 240 may be configured to communicate information representative of the detected physical characteristic to the server computer 300 associated with the movable barrier operator system 10. Thereafter, the determining 1105 may be performed by the server computer 300 using, for example, a deep neural network. Upon the comparison between the physical characteristics of the user and the authorized user physical characteristics data, the server computer may be configured to determine a percent likelihood that there is an exact match. The server computer 300 may then send a verification communication indicating that the detected physical characteristic corresponds to the stored authorized user physical characteristic data when the determined percent likelihood of a match exceeds a defined accuracy threshold (i.e., above ninety percent).

The method 1100 includes receiving 1107 a communication regarding the location of the remote control 30. The communication may be, for example, a location confirmation communication sent from the server computer 300 to the movable barrier operator 12 and/or camera 240 indicating the remote control 30 is within a geofenced area of the location 80. The server computer 300 may receive location data such as GPS data from the remote control 30 and compare the location of the remote control 30 to the GPS data indicating the perimeter of the geofence to determine whether the remote control 30 has traveled into or out of the geofenced area. As another example, the remote control 30 may send information representative of wireless networks within range of the remote control 30 to the server computer 300. The server computer 300 may compare the wireless network information from the remote control 30 to one or more wireless networks detected by the movable barrier operator 12. If the remote control 30 detects a wireless network that is also detected by the movable barrier operator 12, the server computer 300 may determine that remote control 30 is near the garage 16 and sends the location-related communication which is received 1107 by the movable barrier operator for use in decision block 1106.

The method 1100 includes determining 1106 whether the remote control 30 is within or beyond a physical proximity of the location 80. The determining 1106 may take into account data from the detecting 1104, determining 1105, and receiving 1107 operations. The determining 1106 may determine whether the remote control is within or beyond the physical proximity of the location 80 based on one or more of the operations 1104, 1105, 1107. In one embodiment, the controller 255 of the movable barrier operator 12 determines 1106 that the remote control 30 is within the physical proximity of the location 80 if: the operation 1104 detects a particular physical characteristic of a user; the operation 1105 determines the user is verified; and the controller 255 receives 1107 a location confirmation communication from the remote server computer 300 regarding location data from the remote control 30 indicating the remote control 30 is near the location 80.

The determining 1106 may also involve assigning varying weights to the different factors under consideration. For example, the determining 1105 may be given less weight than the operations of detecting 1104 and receiving 1107. With this weighting, the determining 1106 may result in a determination of the remote control 30 being within the physical proximity if: 1) the physical characteristic detected at operation 1104 is a distance between the user and the camera 240 that is within a threshold; 2) the movable barrier operator 12 received 1107 a communication indicating that the remote control 30 is within a geofence of the location 80; and 3) the operation 1105 is unable to determine whether the user is verified. The determining 1106 may result in the determination of the remote control 30 being within the physical proximity because the operations 1104, 1107 independently indicate that the user is in proximity to the location 80. The inability of the operation 1105 to verify the identity of the user may not prevent the determination 1106 of the remote control 30 being within the physical proximity of the location 80 due to the less weight given to operation 1105.

Upon a determination at operation 1106 that the remote control is beyond the physical proximity of the location 80, the method 1100 includes causing 1108 the moving-barrier imminent motion notification apparatus 14 to output an alert in combination with the change of state of the movable barrier 18. Alternatively, upon a determination at operation 1106 that the remote control 30 is within the physical proximity of the location 80, at operation 1110 the controller 255 is configured to cause the moving-barrier imminent motion notification apparatus 14 to refrain from outputting the alert in combination with the change of state of the movable barrier 18.

Referring again generally to FIGS. 1-2, the communication circuitry 250 includes a wireless short-range communication interface 275 configured to communicate with the remote control 30 based on, for example, a paired relationship. The wireless short-range communication interface 275 may utilize one or more protocols including Zigbee, Z-Wave, Bluetooth (or Bluetooth Low Energy (BLE)), Near Field Communications (NFC), Long Terminal Repeat (LTR), Wi-Fi, WiMAX, or other proprietary or public wireless communication methods. During setup of the remote control 30, the remote control 30 may be paired to the wireless short-range communication interface 275 such that pairing information is retained to provide a connection therebetween automatically when the remote control 30 is within the connection range of the interface 275. The connection range of the interface 275 may be selected such that a connection between the interface 275 and the remote control 30 indicates that the vehicle 100 including the remote control 30 is within the physical proximity of the location 80 associated with the movable barrier operator system 10. So configured, the controller 255 may effect a change of state of the movable barrier 18 without operating the moving-barrier imminent motion notification apparatus 14 when the remote control 30 is connected to the interface 275.

In other forms, the communication circuitry 250 may be configured to communicate with the remote control 30 based on an unpaired relationship. For example, the remote control 30 may include a unique identifier (e.g., a Bluetooth address, a near field communication (NFC) identifier, a WiFi MAC address, etc.). The unique identifier may be stored by server computer 300 and communicated to the movable barrier operator 12 such that presence of radio signals from the specific remote control 30 may be identified thereby. In still other forms, the user's remote control 30 may incorporate a "tap-to-open" or "tap-to-close" NFC interaction such that the remote control 30 may be tapped or placed near a control panel associated with the movable barrier operator 12 to cause operation thereof. So configured, the controller 255 may determine that the remote control 30 using the "tap-to-open" or "tap-to-close" interaction must be within the physical proximity of the location 80 such that an imminent motion notification is not required.

By another approach, a LiDAR system 280 may be used to determine whether the remote control 30 is located within or beyond the physical proximity of the location 80 associated with the movable barrier operator system 10. For example, the vehicle 100 including the remote control 30 may additionally include a LiDAR system 280 configured to sense surroundings using pulsed laser light and measure the reflected pulses to create a digital 3-D representation of the environment. So configured, the LiDAR system 280 may identify when the vehicle 100 is in view of the movable barrier 18 associated with the remote control 30. The LiDAR system 280 may then communicate a determination that the movable barrier 18 is in an unobstructed line of sight of the vehicle 100 to the remote control 30. The remote control 30 may in turn communicate with the communication circuitry 250 of the movable barrier operator 12 to indicate that the remote control 30 is within the physical proximity of the location 80 associated with the movable barrier operator system 10 such that operation of the moving-barrier imminent motion notification apparatus 14 is not required.

Determining whether the remote control 30 is within the physical proximity of the location 80 may also be based at least in part on global navigation satellite system (GNSS) data such as, for example, global positioning satellite (GPS) coordinates including a latitude and a longitude associated with the remote control 30. In one embodiment, the communication circuitry 350 of the remote control 30 includes a GPS receiver configured to receive data from GPS satellites that the GPS receiver or the controller 255 uses to determine the location of the remote control 30. By way of example, the location 80 associated with the movable barrier operator system 10 may be the geofenced area 90 as shown in FIG. 1. When the GPS data indicates that the remote control 30 is outside of or beyond the geofenced area 90, the controller 255 of the movable barrier operator system 10 will effect operation of the moving-barrier imminent motion notification apparatus 14 in combination with a change of state of the movable barrier 18. The latitude and longitude of the remote control 30 may be communicated directly to the communication circuitry 250 of the movable barrier operator 12, or may additionally or alternatively be sent to the server computer 40, which may then communicate the latitude and longitude to the communication circuitry 250.

In one embodiment, the memory 265 of the controller 255 is configured for storing a threshold distance corresponding with the physical proximity of the location 80 associated with the movable barrier operator system 10. The controller 255 is configured to compare the threshold distance stored in the memory 265 to the distance measured between the remote control 30 and the location 80. For example, the distance between the remote control 30 and the location 80 may be determined using GPS data and comparing the latitude and longitude of the remote control 30 to the latitude and longitude of the location to determine the absolute distance therebetween. Additionally or alternatively, the distance between the remote control 30 and the location 80 may correspond to the distance the vehicle 100 including the remote control 30 will have to travel along one or more roads to reach the location 80. When the absolute distance between the remote control 30 and the location 80 is greater than the threshold distance, the controller 255 is configured to effect operation of the moving-barrier imminent motion notification apparatus 14 in combination with a change in state of the movable barrier 18 in response the communication circuitry 250 receiving a communication. Additionally, the communication circuitry 255 is configured to receive a second, updated threshold distance from a remote server, such as server computer 40, when a user adjusts the threshold distance. The controller 255 is configured to store the updated threshold distance in the memory 265 for performing the next proximity determination. The receipt of an updated distance threshold may cause the controller 255 to remove the prior distance threshold from the memory 265.

Further, any number of techniques described herein for determining the proximity of the remote control 30 may be used in connection with one another to perform the proximity determination via a sensor fusion algorithm. For example, the proximity determination may rely on both RSSI thresholding in addition to comparison of GPS coordinates, or any other combination of proximity determining techniques to increase at least one of the accuracy, reliability, and precision of the proximity determination. In some embodiments, if even one of the techniques determines that the remote control 30 is beyond the physical proximity of the location 80 associated with the movable barrier operator system 10, then operation of the moving-barrier imminent motion notification apparatus 14 will still occur for the safety reasons discussed herein. For instance, in an example embodiment relying on both GPS coordinates and connection with the wireless short-range interface 275, even if the remote control 30 is connected to the interface 275, when the GPS coordinates indicate that the remote control 30 is beyond the physical proximity then the controller 255 will still effect operation of the moving-barrier imminent motion notification apparatus 14 in combination with operation of the movable barrier 18.

In some embodiments, various other local and remote devices and components may perform the proximity determination in accordance with the above-discussed proximity determining techniques and communicate that determination to the communication circuitry 250 of the movable barrier operator 12. For instance, the server computer 40 or another computing device associated with the movable barrier operator system 10 may determine whether the remote control 30 is within or beyond the physical proximity of the location 80 and communicate the determination to the communication circuitry 250 of the movable barrier operator 12. Such remote determinations may then instruct the controller 255 whether to effect operation of the moving-barrier imminent motion notification apparatus 14. In other embodiments, a processor 355 (see FIG. 3) of the remote control 30 may be configured to perform the proximity determination and communicate that determination via communication circuitry 350 to the communication circuitry 250 of the movable barrier operator 12.

A loop detector may be used in the determination of whether the remote control 30 is within the physical proximity. The loop detector may determine whether the vehicle 100 including the remote control 30 is within the physical proximity based on, for example, changes in inductance or measuring changes in the earth's magnetic field when the vehicle 100 including the remote control 30 passes over a buried or in-pavement loop of the loop detector. An output signal from the loop detector indicating a determination that the remote control 30 is within the physical proximity may then be sent to the communication circuitry 250 of the movable barrier operator 12. Upon receiving a communication from the remote control 30 in conjunction with the loop detector indicating that the remote control 30 is within the physical proximity, the controller 255 effects a change of state of the movable barrier 18 without operating the moving-barrier imminent motion notification apparatus 14.

Figure 3:
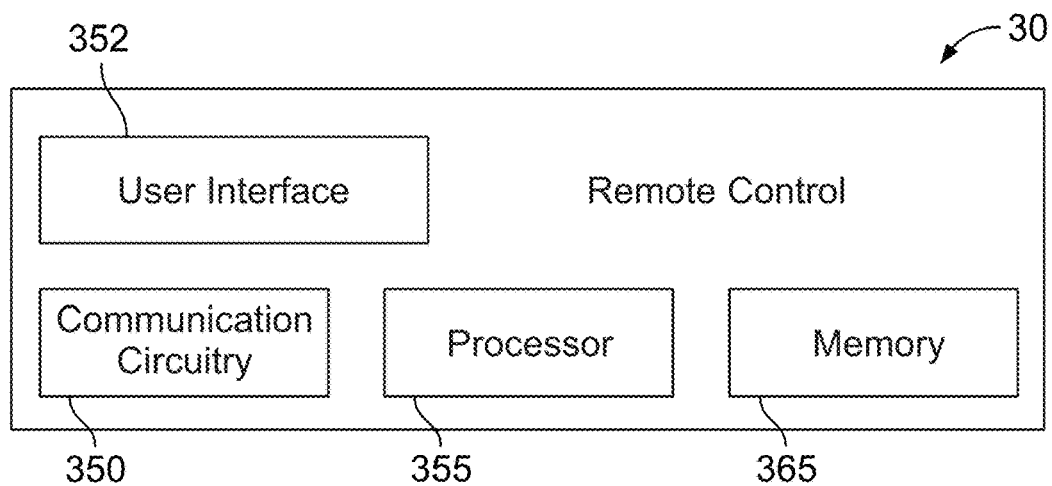
FIG. 3 is a block diagram of one of the remote controls of FIG. 1.

With reference to FIG. 3, the communication circuitry 350 is configured to send a communication to the movable barrier operator 12 to effect movement of the movable barrier 18. For example, the communication circuitry 350 may include a radio frequency transmitter or transceiver configured to communicate with the movable barrier operator 12 via radio frequency signals in the 300 MHz to 900 MHz range. Alternatively or additionally, the communication circuitry 350 may include a wireless wide area network interface/device configured to communicate via cellular (for example, 3G, 4G, 4G LTE, 5G), Wi-MAX, LoRa, or other approaches.

The communication circuitry 350 is further configured to transmit or receive at least one locating indicium used in determining whether the remote control 30 is within the physical proximity of the location 80 associated with the movable barrier operator system 10. The remote control 30 further includes a user interface 352 to receive a user input and, optionally, to provide information to the user.

The processor 355 is connected to the communication circuitry 350, the user interface 352, and a memory 365. The memory 365 comprises a non-transitory computer-readable medium that can store, for example, a fixed or static identifier of the remote control 30, a rolling code algorithm and a current rolling identifier, location data (for example, latitude and longitude coordinates of the geofence 90), or any combination thereof.

The processor 355 is configured to effect movement of the movable barrier 18 in combination with an imminent motion notification when the remote control 30 is determined to be beyond the physical proximity of the location 80. The processor 355 is configured to effect movement of the movable barrier 18 by, for example, causing the communication circuitry 350 to send a radio frequency communication directly to the movable barrier operator 12. Alternatively, the processor 355 may send a communication indirectly to the movable barrier operator 12 by causing the communication circuitry 350 to send a state change request to the server computer 40. In turn, the server computer 40 may then send a command message to the movable barrier operator 12 via the network 44.

The user interface 352 may include a display screen, one or more buttons, a microphone, a speaker, or a combination thereof. A user input at the user interface 352 may cause the processor 355 to cause the communication circuitry 350 to send a communication directly or indirectly to the movable barrier operator 12.

The determination of whether the remote control 30 is within or beyond the physical proximity of the location 80 associated with the movable barrier operator system 10 may be performed by the processor 355 of the remote control 30. In one embodiment, the communication circuitry 350 of the remote control 30 may be configured to receive a locating indicium from an external device such as, for example, the server computer 40 or the movable barrier operator system 10. In another embodiment, the communication circuitry 350 of the remote control 30 is configured to transmit the locating indicium to the movable barrier operator 12, the server computer 40, and/or another device.

The at least one locating indicium transmitted or received by the communication circuitry 350 may include raw data obtained by any of the proximity techniques discussed above with respect to FIG. 2, among others, or data representing a determination of a location of the remote control 30. As other examples, the at least one locating indicium may include a signal associated with cell tower triangulation of the remote control 30 or an ultrasonic sound. The proximity determination may be based at least in part on any of the locating indicia described herein, among others.

Upon the processor 355 determining that the remote control 30 is within the physical proximity of the location 80 associated with the movable barrier operator system 10, the communication circuitry 350 may communicate a non-notification instruction or indication to the communication circuitry 250 of the movable barrier operator. The communication that the remote control 30 sends to the movable barrier operator 12 to effect a change of state of the movable barrier may contain the non-notification instruction. In another approach, the non-notification instruction may be a separate communication.

The non-notification instruction is configured to instruct the controller 255 of the movable barrier operator 12 to not operate the moving-barrier imminent motion notification apparatus 14 when the movable barrier 18 is opened or closed. As another example, the controller 255 does not operate the moving-barrier imminent motion notification apparatus 14 unless the communication circuitry 250 receives a notification instruction from the remote control 30. The processor 355 may effect non-operation of the moving-barrier imminent notification apparatus 14 by not sending the notification instruction to the movable barrier operator 12.

In one embodiment, the communication circuitry 350 of the remote control 30 includes a global positioning satellite (GPS) receiver and the at least one locating indicium includes data from GPS satellites. Upon receiving the GPS data, the processor 355 of the remote control 30 may calculate the location of the remote control 30 and compare the calculated location with the location 80 associated with the movable barrier operator system 10 to determine whether the remote control 30 is located within or beyond the physical proximity. The communication circuitry 350 of the remote control 30 may then communicate the proximity determination to the communication circuitry 250 of the movable barrier operator 12.

In another embodiment, the at least one locating indicium may include an ultrasonic signal. As another example, the remote control 30 may include an ultrasonic transmitter and the movable barrier operator 12 may include an ultrasonic receiver, or vice versa. To determine whether the remote control 30 is within or beyond the physical proximity of the location 80 associated with the movable barrier operator system 10, either the remote control 30 or the movable barrier operator 12 may emit an ultrasonic signal which, if the remote control 30 is within the physical proximity, may be received and then analyzed to evaluate the distance between the remote control 30 and the movable barrier operator 12.

In one embodiment, the communication circuitry 350 of the remote control 30 communicates via a cellular or other wide-area or long-range network. The proximity determination may be based on triangulation data of the remote control 30. Specifically, the processor 355 of the remote control 30 may measure a time delay that a cellular signal takes to return from at least two cell towers associated with the cellular network. The processor 355 may then determine the location of the remote control 30 by comparing the time delays to the location of the cell towers. That location may in turn be used to determine whether the remote control is within or beyond the physical proximity of the location 80 associated with the movable barrier operator system 10. The communication circuitry 350 may then communicate the proximity determination to the communication circuitry 250 of the movable barrier operator 12.

Figure 4:
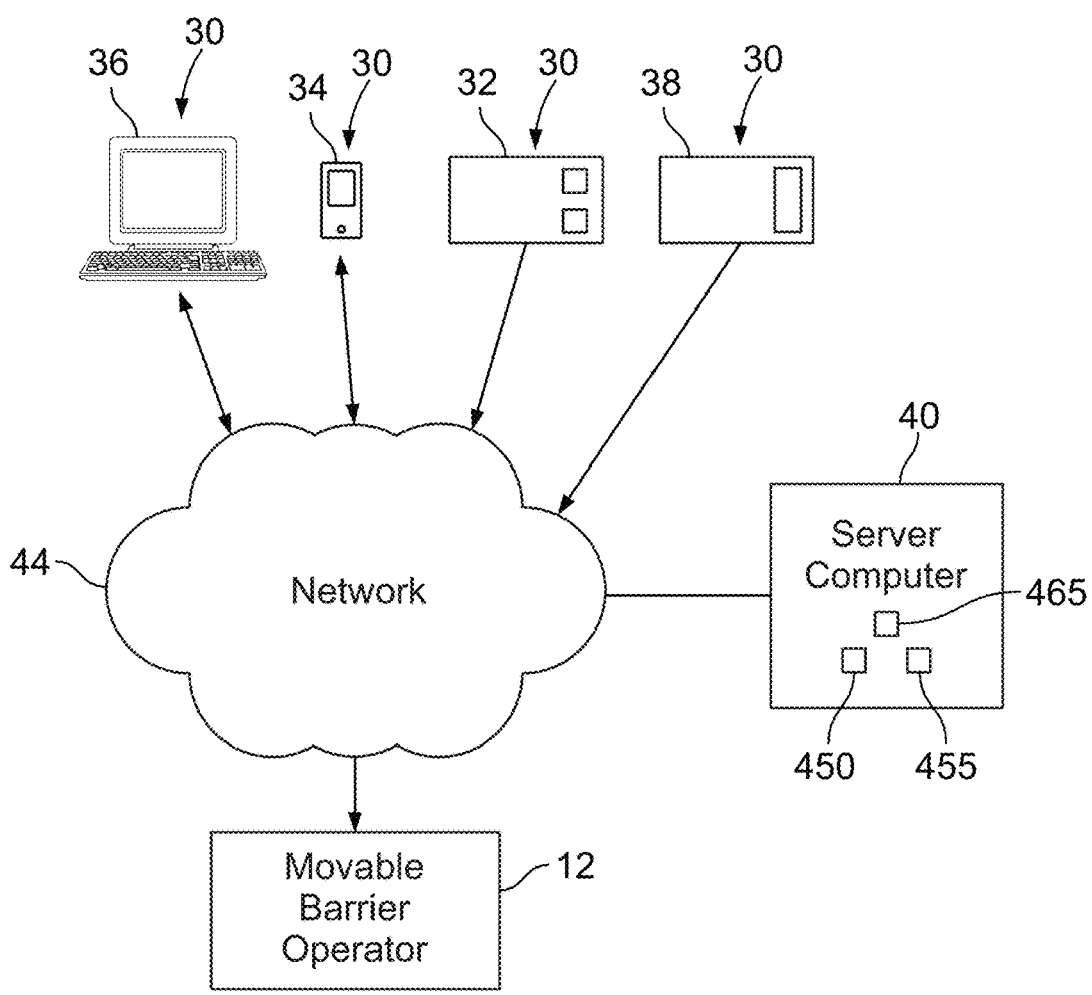
FIG. 4 is a schematic view of an example server computer for facilitating operation of the movable barrier operator of FIG. 1.

With reference to FIG. 4, the server computer 40 for facilitating operation by the remote control 30 of the movable barrier operator system 10 includes a communication interface 450, a processor 455, and a memory 465. The memory 465 comprises a non-transitory computer-readable medium that may be configured to store for example, threshold distances, threshold signal strengths, location data (for example, latitude and longitude coordinates of the geofence 90), and other data to be used in performing the proximity determination. The processor 455 may be configured to execute computer-readable instructions stored on the memory 465. The communication interface 450 is configured to communicate with the movable barrier operator system 10 and the remote control 30 via the network 44, such as the internet or a local area network, and may also receive a state change request from the remote control 30, the state change request configured to cause the server computer 40 to either open or close the movable barrier 18. When the communication interface 450 receives the state change request from the remote control 30, the processor 455 is configured to cause the communication interface 450 to communicate a command message to the movable barrier operator system 10. The command message is configured to effect a change in state of the movable barrier 18 in combination with operation of the moving-barrier imminent motion notification apparatus 14 upon a determination that the remote control 30 is located beyond the physical proximity of the location 80 associated with the movable barrier operator system 10.

In one embodiment, the proximity determination is performed by the processor 455 of the server computer 40 before communicating the command message to the movable barrier operator system 10. For example, the communication interface 450 of the server computer 40 may be configured to receive data representing one or more characteristics of the remote control 30, such as location data representing the physical location of the remote control 30. The location data can be raw data obtained by any of the proximity techniques discussed above with respect to FIGS. 2-3, or data representing a determined location. The location data should be understood to refer to data representing the physical location of the remote control 30 that is capable of being compared to the location 80 associated with the movable barrier operator system 10 to determine whether the remote control 30 is within or beyond the physical proximity.

Alternatively, the location data could be representative of the determination of the remote control 30 being within or beyond the physical proximity made by, for example, the controller 255 or the processor 355, and then communicated to the communication circuitry 450 of the server computer 40. Upon receiving a determination that the remote control 30 is beyond the physical proximity, the processor 455 is configured to cause the communication interface 450 to communicate a command message including a non-notification signal to the communication circuitry 250 of the movable barrier operator 12 to effect a change in state of the movable barrier 18 without operating the moving-barrier imminent motion notification apparatus 14.

Figure 5:
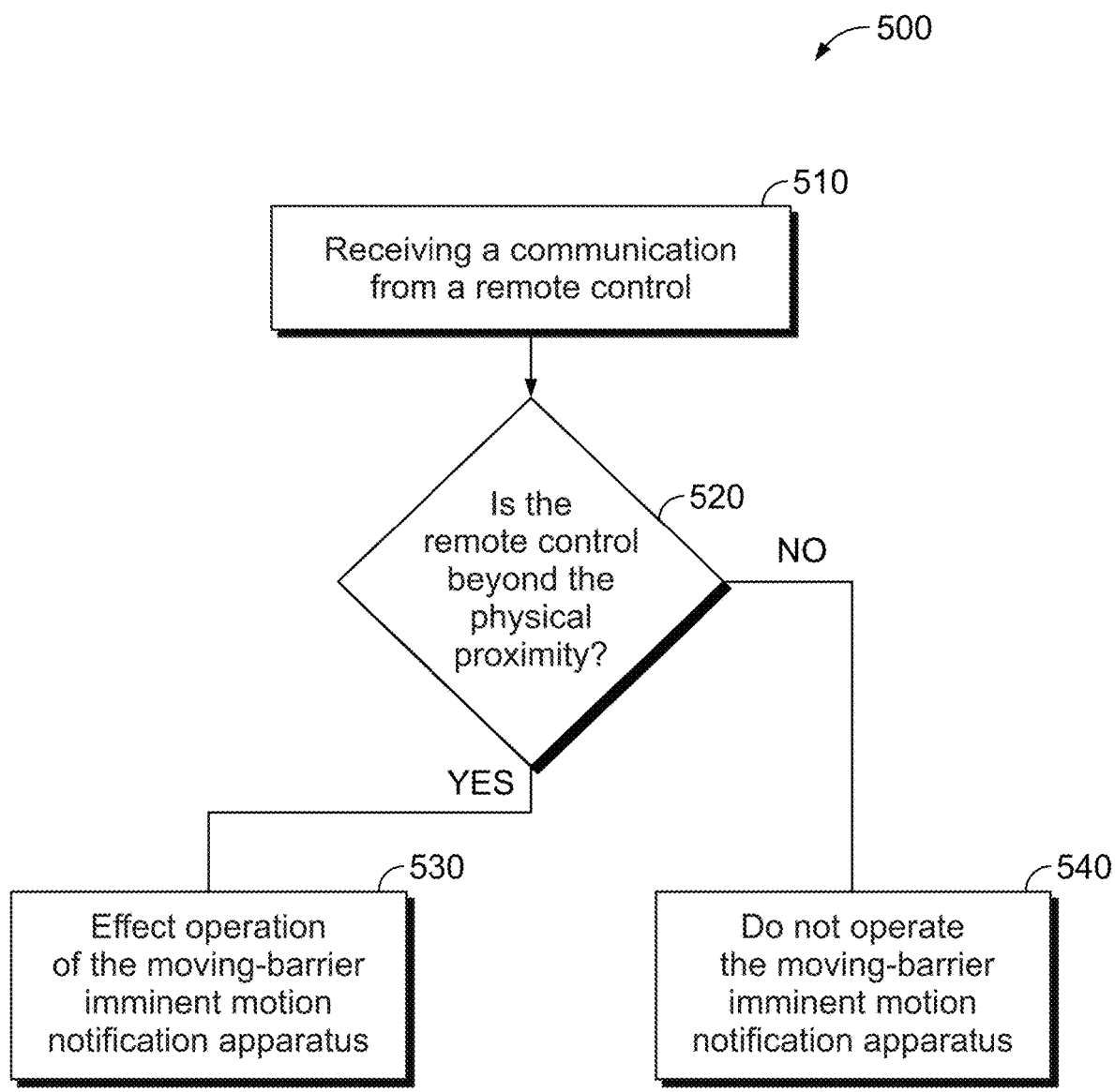
FIG. 5 is a flow chart of an example method for operating a movable barrier operator system having a moving-barrier imminent motion notification apparatus.

With reference to FIG. 5, a method 500 is provided for operating the movable barrier operator 12. The method 500 includes the operation 510 of receiving at the movable barrier operator 12 a communication from the remote control 30 configured to change a state of the movable barrier 18. The method also includes the operation 520 of determining whether the remote control 30 is within or beyond the physical proximity of the location 80 associated with the movable barrier operator system 10. The operation 520 may be performed, for example, by the controller 255 of the movable barrier operator 12. Alternatively, the operation 520 may be performed by the processor 355 of the remote control 30 or the processor 455 of the server computer 40 and communicated to the communication circuitry 250 of the movable barrier operator 12. The determination may be based, at least in part, on data obtained by any of the location determining techniques discussed above with respect to FIGS. 2-4. In response to a determination 520 that the remote control 30 is beyond the physical proximity, the movable barrier operator 12 is configured to effect operation of the moving-barrier imminent motion notification apparatus 14 in combination with movement of the movable barrier 18 in operation 530. When the determination 520 indicates that the remote control 30 is within the physical proximity, in operation 540 the movable barrier operator 12 moves the movable barrier 18 and inhibits operation of the moving-barrier imminent motion notification apparatus 14.

Figure 6:
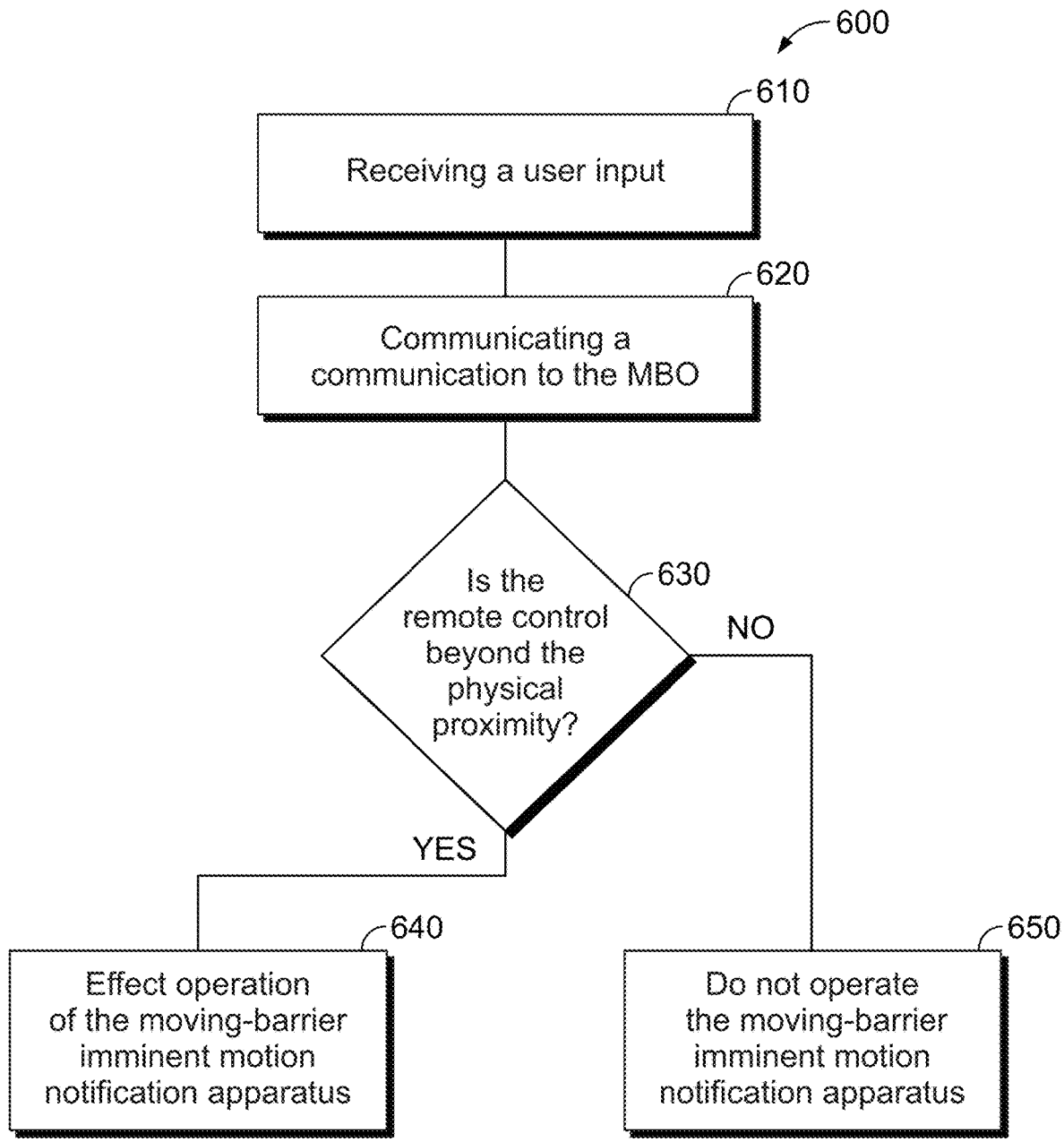
FIG. 6 is a flow chart of an example method for operating, by a remote control, a movable barrier operator system having a moving-barrier imminent motion notification apparatus.

With reference to FIG. 6, a method 600 is provided for operating the movable barrier operator 12 using the remote control 30. The method 600 includes operation 610 of receiving a user input at the user interface 352 of the remote control 30 and operation 620 of communicating with the movable barrier operator 12 in response to the receiving the user input. The method 600 further includes the operation 630 of determining whether the remote control 30 is within or beyond the physical proximity of the location 80 associated with the movable barrier operator system 10. The operation 630 of determining may be performed, for example, by the processor 355 of the remote control 30. Alternatively, the operation 630 may be performed by the controller 255 of the movable barrier operator 12 or the processor 455 of the server computer 40 and communicated to the communication interface 350 of the remote control 30. The determination may be based, at least in part, on a locating indicium of the remote control 30. The locating indicium can be raw data obtained by any of the location determining techniques discussed above with respect to FIGS. 2-4, among others, or data representative of such a determination.

The method 600 further includes operation 640 of effecting operation of the moving-barrier imminent motion notification apparatus 14 in combination with changing a state of the movable barrier 18 upon a determination of the remote control 30 being beyond the physical proximity. The method 600 includes operation 650 of not effecting operation of the moving-barrier imminent motion notification apparatus 14 along with effecting movement of the movable barrier when the remote control 30 is determined to be within the physical proximity. Alternatively, operation 650 may include the remote control 30 communicating a non-notification instruction to the communication circuitry 250 of the movable barrier operator 12 to effect a change in state of the movable barrier 18 without operating the moving-barrier imminent motion notification apparatus 14.

Figure 7:
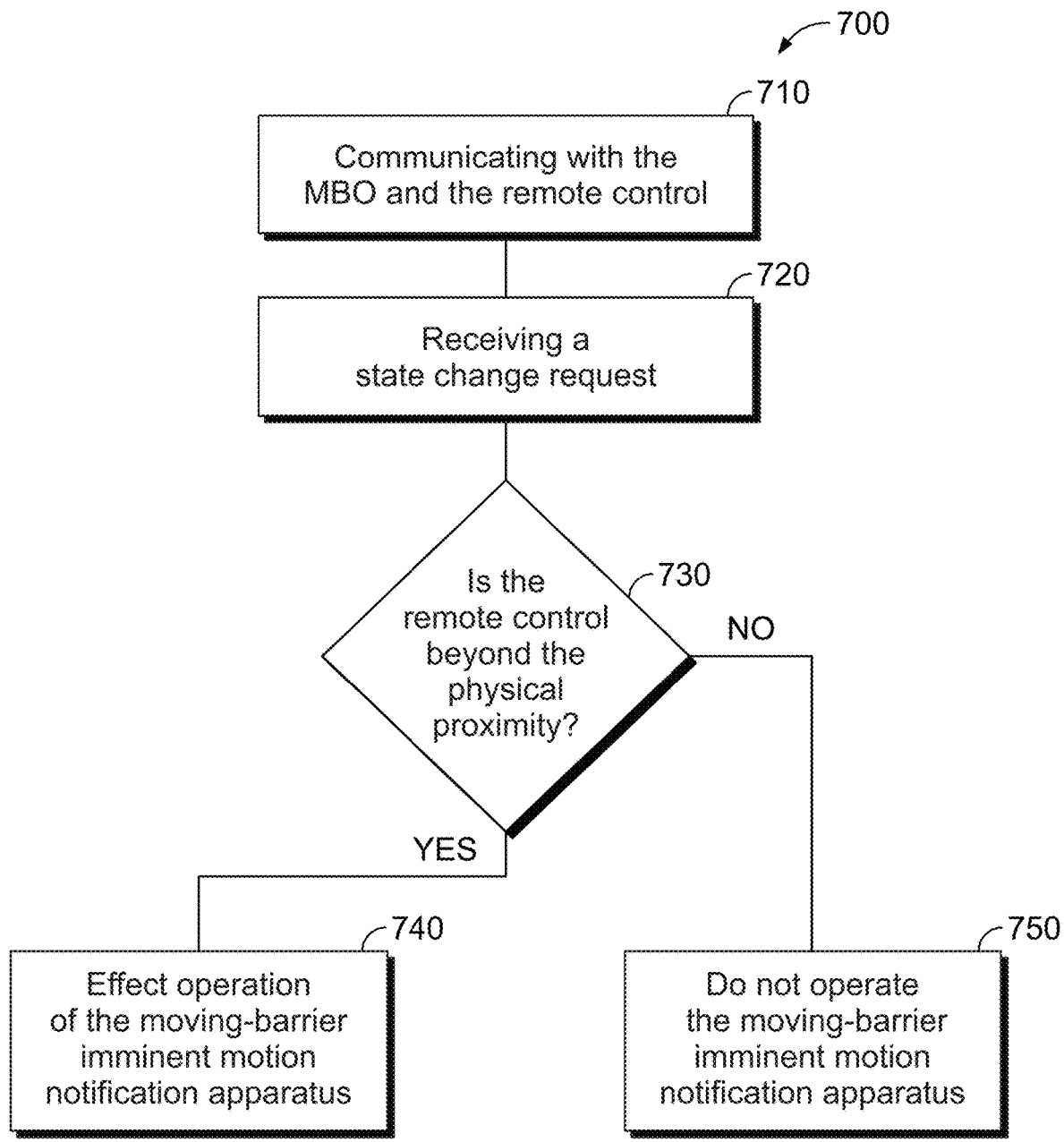
FIG. 7 is a flow chart of an example method for operating, by a server computer, a movable barrier operator system having a moving-barrier imminent motion notification apparatus.

With reference to FIG. 7, a processor 455 of the server computer 40 may execute instructions stored on a non-transitory computer readable medium that cause the processor 455 to perform a method 700. The method 700 includes the operation 710 of communicating with the movable barrier operator 12 and the remote control 30 via the network 44, and operation 720 of receiving a state change request from the remote control 30. The method 700 additionally includes operation 730 of determining whether the remote control 30 is within or beyond the physical proximity of the location 80 associated with the movable barrier operator system 10. The operation 730 of determining may be performed, for example, by the processor 455 of the server computer 40. Alternatively, the operation 730 may be performed by the controller 255 of the movable barrier operator 12 or the processor 355 of the remote control 30 and communicated to the communication interface 450 of the server computer 40. The determination may be based, at least in part, on location data of the remote control 30. The location data can be raw data obtained by any of the location determining techniques discussed above with respect to FIGS. 2-4, among others, or data representative of such a determination.

Operation 740 includes effecting operation of the moving-barrier imminent motion notification apparatus 14 in combination with changing a state of the movable barrier 18 upon a determination of the remote control 30 being beyond the physical proximity. At operation 750, inhibiting operation of the moving-barrier imminent motion notification apparatus 14 is performed in conjunction with effecting movement of the movable barrier upon the remote control 30 being determined to be within the physical proximity.

Those skilled in the art will recognize that a wide variety of modifications, alterations, and combinations can be made with respect to the above described embodiments without departing from the scope of the invention. For instance, although the described embodiments include a garage door, various types of movable barrier systems can employ these teachings, for example, swinging gates, rolling gates, rising gates, and the like. Such modifications, alterations, and combinations are to be viewed as being within the ambit of the inventive concept.

What is claimed is:

1. A movable barrier operator system for controlling operation of a movable barrier, the movable barrier operator system comprising:
   communication circuitry configured to communicate with a remote control and further configured to receive data from a remote sensor;
   an imminent motion notification apparatus configured to output an alert; and
   a controller operably coupled to the communication circuitry and the imminent motion notification apparatus, the controller configured to cause a change of state of the movable barrier upon the communication circuitry receiving a communication from the remote control;
   wherein the controller is configured to cause the imminent motion notification apparatus to output the alert in combination with the change of state of the movable barrier upon a determination of the remote control being beyond a physical proximity of a location associated with the movable barrier operator system, the determination based at least in part on the data received from the remote sensor;
   wherein the controller is configured to inhibit the output of the alert by the imminent motion notification apparatus upon said determination indicating that the remote control is within the physical proximity of the location associated with the movable barrier operator system.

2. The system of claim 1 wherein the controller is configured to determine whether the remote control is within or beyond the physical proximity.

3. The system of claim 1 wherein the communication circuitry is further configured to communicate with a remote computer and receive, from the remote computer, a determination communication indicative of whether the remote control is within or beyond the physical proximity.

4. The system of claim 1 wherein the remote sensor includes a camera, and wherein the controller is configured to determine whether the remote control is proximate the remote sensor based at least in part on image recognition.

5. The system of claim 1 wherein the remote sensor includes an optical emitter and an optical detector.

6. The system of claim 1 wherein the remote control is further configured to emit a radio frequency beacon signal,
   wherein the remote sensor is configured to detect the radio frequency beacon signal to indicate whether the remote control is proximate the remote sensor, and
   wherein the determination of whether the remote control is within the physical proximity of the location is based at least in part on whether the remote sensor has received the radio frequency beacon signal.

7. The system of claim 1 wherein the determination of the remote control being within or beyond the physical proximity of the location includes a determination of a position of a user associated with the remote control.

8. The system of claim 7 wherein the remote sensor includes a camera, and wherein the determination of the position of the user is based at least in part upon capture by the camera of a physical characteristic of the user.

9. A movable barrier operator system for controlling operation of a movable barrier, the movable barrier operator system comprising:
at least one camera configured to capture a physical characteristic of a user;
communication circuitry configured to communicate with a remote control associated with the user;
an imminent motion notification apparatus configured to output an alert; and
a controller operably coupled to the communication circuitry and the imminent motion notification apparatus, the controller configured to cause a change of state of the movable barrier upon the communication circuitry receiving a communication from the remote control;
wherein the controller is further configured to cause the imminent motion notification apparatus to output the alert in combination with the change of state of the movable barrier upon a determination of the remote control being beyond a physical proximity of a location associated with the movable barrier operator system based at least in part on the physical characteristic of the user captured by the at least one camera; and
wherein the controller is further configured to inhibit output of the alert by the imminent motion notification apparatus upon a determination of the remote control being within the physical proximity based at least in part on the physical characteristic of the user captured by the at least one camera.

10. The system of claim 9 wherein the communication circuitry is configured to communicate with the at least one camera; and
wherein the controller is configured to determine whether the remote control is within or beyond the physical proximity of the location associated with the movable barrier operator system based at least in part on the physical characteristic of the user captured by the at least one camera.

11. The system of claim 9 wherein the communication circuitry is configured to communicate with the at least one camera; and
wherein the controller is configured to cause the communication circuitry to communicate information representative of the physical characteristic to a remote computer via a network.

12. The system of claim 11 wherein the communication circuitry is configured to receive a verification communication from the remote computer responsive to the information representative of the physical characteristic; and
the controller is configured to determine the remote control being within the physical proximity based at least in part upon the communication circuitry receiving the verification communication from the remote computer.

13. The system of claim 9 wherein the communication circuitry is configured to communicate with a remote computer via a network and receive, from the remote computer, a determination communication indicative of whether the remote control is within or beyond the physical proximity of the location.

14. The system of claim 9 wherein the physical characteristic includes at least one facial feature of the user.

15. The system of claim 9 wherein the at least one camera includes two or more cameras configured to cooperate to capture the physical characteristic of the user.

16. The system of claim 15 wherein the communication circuitry is configured to communicate with the two or more cameras; and
wherein the controller is configured to determine whether the remote control is within or beyond the physical proximity of the location by comparing image data from the two or more cameras.

17. The system of claim 9 wherein the controller is configured to determine whether the remote control is within or beyond the physical proximity based at least in part on a signal strength of the communication from the remote control.

18. The system of claim 9 wherein the location associated with the movable barrier operator system includes a geofenced area; and
wherein the communication circuitry is configured to communicate with a remote computer via a network, the communication circuitry configured to receive a determination communication from the remote computer indicative of whether the remote control is within or beyond the physical proximity based at least in part on whether the remote control is within the geofenced area.

19. A method of operating a movable barrier operator system that includes at least one camera and a moving-barrier imminent motion notification apparatus, the method comprising:
at the movable barrier operator system:
receiving a communication from a remote control, the communication configured to cause the movable barrier operator system to change a state of a movable barrier;
capturing, via the at least one camera, a physical characteristic of a user associated with the remote control;
causing the moving-barrier imminent motion notification apparatus to output an alert in combination with the change of state of the movable barrier upon a determination of the remote control being beyond a physical proximity of a location associated with the movable barrier operator system based at least in part on a comparison of the physical characteristic of the user to authorized physical characteristic data; and
causing the moving-barrier imminent motion notification apparatus to refrain from outputting the alert in combination with the change of state of the movable barrier upon a determination of the remote control being within the physical proximity based at least in part on said comparison.

20. The method of claim 19 further comprising, at the movable barrier operator, determining whether the remote control is within or beyond the physical proximity of the location associated with the movable barrier operator system based at least in part on the physical characteristic of the user captured using the at least one camera.

21. The method of claim 19 further comprising causing communication circuitry of the movable barrier operator system to communicate information representative of the physical characteristic to a remote computer via a network.

22. The method of claim 21 further comprising:
at the movable barrier operator system:
receiving a verification communication from the remote computer responsive to the information representative of the physical characteristic; and determining whether the remote control is within or beyond the physical proximity based at least in part upon the movable barrier operator system receiving the verification communication from the remote computer.

23. The method of claim 19 further comprising:
at the movable barrier operator system:
receiving a determination communication indicative of whether the remote control is within or beyond the physical proximity.

24. The method of claim 19 wherein the physical characteristic includes at least one facial feature of the user.

25. The method of claim 19 wherein the at least one camera includes a plurality of cameras, the method further comprising determining whether the remote control is within or beyond the physical proximity of the location by comparing image data from the cameras.

26. The method of claim 19 further comprising:
detecting a signal strength of the communication from the remote control; and
wherein determining whether the remote control is within or beyond the physical proximity of the location includes comparing the detected signal strength to a predetermined signal strength threshold.

27. The method of claim 19 wherein the location associated with the movable barrier operator system includes a geofenced area;
wherein determining whether the remote control is within or beyond the physical proximity of the location includes determining whether the remote control is within the geofenced area.

28. A method of operating a movable barrier operator system that includes a camera and a moving-barrier imminent motion notification apparatus, the method comprising:
capturing, via the camera, a physical characteristic of a user proximate a movable barrier associated with the moving-barrier imminent motion notification apparatus;
determining whether the user proximate the movable barrier is verified based at least in part on a comparison between the physical characteristic of the user captured by the camera and authorized user physical characteristic data;
receiving, at the movable barrier operator system, a communication configured to cause the movable barrier operator system to change a state of the movable barrier;
causing the moving-barrier imminent motion notification apparatus to output an alert in combination with the change of state of the movable barrier upon the user proximate the movable barrier not being verified; and
causing the moving-barrier imminent notification apparatus to refrain from outputting the alert in combination with the change of state of the movable barrier upon the user proximate the movable barrier being verified.

29. The method of claim 28 wherein determining whether the user proximate the movable barrier is verified includes using a processor of at least one of the camera, the moving-barrier imminent motion notification apparatus, a movable barrier operator, and a remote computer to compare the physical characteristic of the user captured by the camera to the authorized user physical characteristic data.

30. The method of claim 29 further comprising deleting the authorized user physical characteristic data from a memory accessible by the processor after a predetermined period of time.

31. The method of claim 28 further comprising:
communicating information representative of the physical characteristic of the user captured by the camera to a remote computer via a network; and
wherein determining whether the user proximate the movable barrier is verified includes the remote computer comparing the physical characteristic of the user captured by the camera and the authorized user physical characteristic data.

32. The method of claim 28 wherein the physical characteristic of the user includes at least one facial feature; and
determining whether the user proximate the movable barrier is verified includes utilizing an image recognition algorithm to compare the physical characteristic of the user and the authorized user physical characteristic data.

* * * * *